United States Patent
Abdalla et al.

(10) Patent No.: US 11,349,208 B2
(45) Date of Patent: May 31, 2022

(54) ANTENNA APPARATUS WITH SWITCHES FOR ANTENNA ARRAY CALIBRATION

(71) Applicant: Analog Devices International Unlimited Company, Limerick (IE)

(72) Inventors: Mohamed Ahmed Youssef Abdalla, Cairo (EG); Ahmed Essam Eldin Mahmoud Amer, Qalyoubia (EG); Ahmed Khalil, Dracut, MA (US)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 533 days.

(21) Appl. No.: 16/246,917

(22) Filed: Jan. 14, 2019

(65) Prior Publication Data
US 2020/0227824 A1   Jul. 16, 2020

(51) Int. Cl.
| | |
|---|---|
| *H04B 17/12* | (2015.01) |
| *H01Q 3/26* | (2006.01) |
| *H04B 17/21* | (2015.01) |
| *H04B 7/06* | (2006.01) |

(52) U.S. Cl.
CPC ............ *H01Q 3/267* (2013.01); *H04B 7/0617* (2013.01); *H04B 17/12* (2015.01); *H04B 17/21* (2015.01)

(58) Field of Classification Search
CPC ...... H04B 17/12; H04B 17/21; H04B 7/0617; H01Q 3/267; H01Q 9/30; H01Q 9/0407; H01Q 13/10; H01Q 21/062; H01Q 21/065; H01Q 21/067
See application file for complete search history.

(56) References Cited

U.S. PATENT DOCUMENTS

| | | |
|---|---|---|
| 4,864,315 A | 9/1989 | Mohuchy |
| 5,235,342 A | 8/1993 | Orton et al. |
| 5,657,023 A | 8/1997 | Lewis et al. |
| 5,864,543 A | 1/1999 | Hoole |
| 6,104,935 A | 8/2000 | Smith et al. |

(Continued)

FOREIGN PATENT DOCUMENTS

| | | |
|---|---|---|
| CN | 1830159 A | 9/2006 |
| EP | 2 722 928 A1 | 4/2014 |
| WO | 2005/015771 A1 | 2/2005 |

OTHER PUBLICATIONS

Babur et al., *Simple Calibration Technique for Phased Array Radar Systems*, Progress in Electromagnetics Research M, vol. 55, 109-119 (11 pages), 2017.

(Continued)

*Primary Examiner* — Thanh C Le
(74) *Attorney, Agent, or Firm* — Patent Capital Group

(57) ABSTRACT

An antenna apparatus for calibrating one or more of a plurality of antenna elements of an antenna array using one or more probes is disclosed. The apparatus includes an upconverter and/or downconverter (UDC) circuit and a calibration arrangement that includes a switching circuit. The switching circuit is configured to enable operation of the UDC in a first mode or in a second mode. When the UDC is in the first mode, the one or more probes are electrically disconnected from the UDC circuit and the UDC may be connected to at least one of the antenna elements. When the UDC is in the second mode, at least one of the one or more probes is connected to the UDC circuit.

35 Claims, 28 Drawing Sheets

(56) References Cited

U.S. PATENT DOCUMENTS

| | | |
|---|---|---|
| 6,133,868 A | 10/2000 | Butler et al. |
| 6,208,287 B1 | 3/2001 | Sikina et al. |
| 6,252,542 B1 | 6/2001 | Sikina et al. |
| 6,356,233 B1 | 3/2002 | Miller et al. |
| 6,624,784 B1 | 9/2003 | Yamaguchi |
| 7,068,218 B2 | 6/2006 | Gotti et al. |
| 7,714,776 B2 | 5/2010 | Cooper et al. |
| 7,812,775 B2 | 10/2010 | Babakhani et al. |
| 8,199,048 B1 | 6/2012 | Medina Sanchez |
| 8,593,337 B2 | 11/2013 | Ookawa |
| 8,976,845 B2 | 3/2015 | O'Keeffe et al. |
| 9,537,584 B2 | 1/2017 | Nicolson et al. |
| 9,692,530 B2 | 6/2017 | O'Keeffe et al. |
| 9,705,611 B1 | 7/2017 | West |
| 9,887,760 B1 | 2/2018 | Sridharan et al. |
| 10,469,183 B1 | 11/2019 | Kuo et al. |
| 10,998,987 B2* | 5/2021 | Decurninge ......... H04B 7/0456 |
| 11,165,480 B2* | 11/2021 | Jin ....................... H04B 7/0417 |
| 2001/0005685 A1 | 6/2001 | Nishimori et al. |
| 2002/0089447 A1 | 7/2002 | Li |
| 2002/0171583 A1 | 11/2002 | Purdy et al. |
| 2004/0032365 A1 | 2/2004 | Gotti et al. |
| 2004/0061644 A1 | 4/2004 | Lier et al. |
| 2006/0234694 A1 | 10/2006 | Kawasaki et al. |
| 2006/0273959 A1 | 12/2006 | Kawasaki |
| 2008/0129613 A1 | 6/2008 | Ermutlu et al. |
| 2009/0267824 A1 | 10/2009 | Cooper et al. |
| 2011/0006949 A1 | 1/2011 | Webb |
| 2012/0027066 A1 | 2/2012 | O'Keeffe |
| 2012/0146840 A1 | 6/2012 | Ookawa |
| 2013/0234883 A1 | 9/2013 | Ma et al. |
| 2014/0111373 A1 | 4/2014 | Puzella et al. |
| 2014/0169509 A1 | 6/2014 | Tsofe |
| 2014/0210668 A1 | 7/2014 | Wang et al. |
| 2014/0242914 A1 | 8/2014 | Monroe |
| 2014/0354507 A1 | 12/2014 | Maca et al. |
| 2015/0115978 A1 | 4/2015 | Bories et al. |
| 2015/0138026 A1 | 5/2015 | Shay |
| 2016/0043465 A1 | 2/2016 | McDevitt et al. |
| 2017/0117950 A1* | 4/2017 | Strong ................. H04B 7/0617 |
| 2017/0234971 A1 | 8/2017 | Arai |
| 2017/0310004 A1 | 10/2017 | Swirhun et al. |
| 2017/0324486 A1 | 11/2017 | Garcia et al. |
| 2018/0034565 A1 | 2/2018 | Tankielun et al. |
| 2018/0102827 A1* | 4/2018 | Noh ..................... H04B 7/0695 |
| 2018/0145718 A1 | 5/2018 | Margomenos |
| 2018/0198537 A1 | 7/2018 | Rexberg |
| 2018/0323853 A1 | 11/2018 | Sridharan et al. |
| 2019/0081596 A1* | 3/2019 | Dunworth ............. H03F 3/211 |
| 2019/0149247 A1 | 5/2019 | Ananth et al. |
| 2019/0158194 A1 | 5/2019 | Wang et al. |
| 2019/0267707 A1 | 8/2019 | Khalil et al. |
| 2020/0014105 A1 | 1/2020 | Braun et al. |
| 2020/0076517 A1* | 3/2020 | Zhu ....................... H01Q 3/267 |
| 2020/0259462 A1* | 8/2020 | Wu .......................... H03F 1/30 |
| 2020/0322068 A1 | 10/2020 | Jidhage et al. |
| 2021/0344397 A1* | 11/2021 | Lee ...................... H04L 5/0048 |
| 2021/0384992 A1* | 12/2021 | Lilbert .................. H01Q 3/267 |

OTHER PUBLICATIONS

Komljenovic et al., *On-chip calibration and control of optical phased arrays*, Optics Express, vol. 25, No. 3, Feb. 5, 2018, Optics Express 3199, 12 pages.

Inac et al., *A Phased Array RFIC With Built-In Self-Test Capabilities*, IEEE Transactions on Microwave Theory and Techniques, vol. 60, No. 1, Jan. 2012, 0018-9480 © 2011 IEEE, 10 pages.

Babur et al., *Improved Calibration Technique for the Transmit Beamforming by a coherent MIMO Radar with Collocated Antennas*, 978-1-4673-5225-3/14 © 2014 IEEE, 4 pages.

Office Action issued in CN202010035286.2 dated Nov. 13, 2020, 16 pages.

* cited by examiner

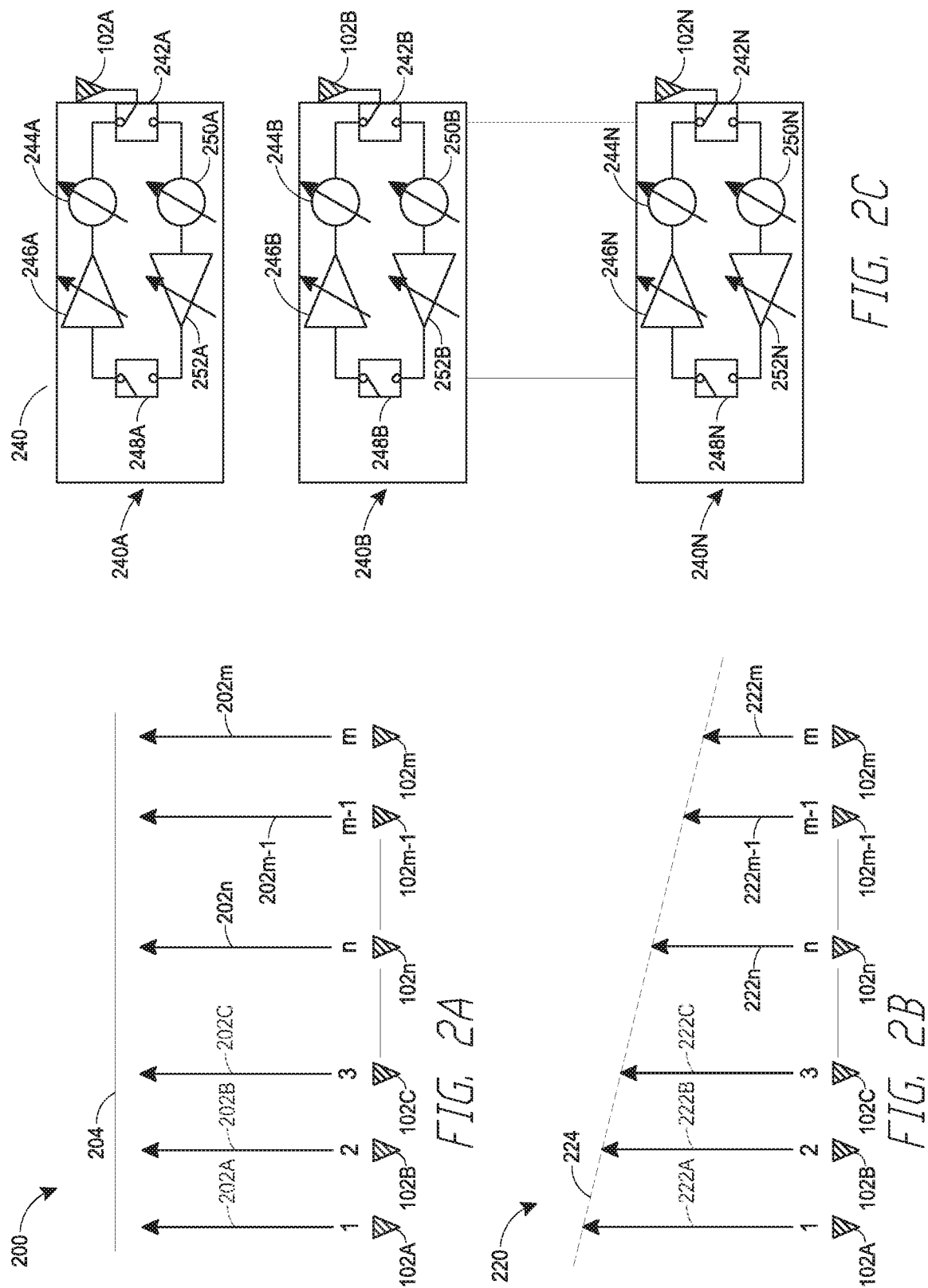

ANTENNA APPARATUS WITH SWITCHES FOR ANTENNA ARRAY CALIBRATION

CROSS REFERENCE TO RELATED APPLICATIONS

This application is related to U.S. patent application Ser. No. 15/904,045, filed Feb. 23, 2018, titled "ANTENNA ARRAY CALIBRATION SYSTEMS AND METHODS," the disclosure of which is hereby incorporated by reference herein in its entirety.

TECHNICAL FIELD OF THE DISCLOSURE

The present disclosure generally relates to radio frequency (RF) systems and, more particularly, to an antenna array and calibration of the antenna array.

BACKGROUND

Radio systems are systems that transmit and receive signals in the form of electromagnetic waves in the RF range of approximately 3 kiloHertz (kHz) to 300 gigaHertz (GHz). Radio systems are commonly used for wireless communications, with cellular/wireless mobile technology being a prominent example.

In context of radio systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave in order to produce an electric current at its terminals, which current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element will typically broadcast a radiation pattern that radiates equally in all directions in a spherical wavefront. Phased antenna arrays generally refer to a collection of antenna elements that are used to focus electromagnetic energy in a particular direction, thereby creating a main beam. Phased antenna arrays offer numerous advantages over single antenna systems, such as high gain, ability to perform directional steering, and simultaneous communication. Therefore, phased antenna arrays are being used more frequently in a myriad of different applications, such as in military applications, mobile technology, on airplane radar technology, automotive radars, cellular telephone and data, and Wi-Fi technology.

The individual antenna elements of a phased antenna array may radiate in a spherical pattern, but collectively generate a wavefront in a particular direction through constructive and destructive interference. The relative phases of the signal transmitted at each antenna element can be either fixed or adjusted, allowing the antenna system to steer the wavefront in different directions. A phased antenna array typically includes an oscillator, a plurality of antenna elements, a phase adjuster or shifter, a variable gain amplifier, a receiver, and a control processor. A phased antenna array system uses phase adjusters or shifters to control the phase of the signal transmitted by an antenna element. The radiated patterns of the antenna elements constructively interfere in a particular direction creating a wavefront in that direction called the main beam. The phased array can realize increased gain and improve signal to interference plus noise ratio in the direction of the main beam. The radiation pattern destructively interferes in several other directions other than the direction of the main beam, and can reduce gain in those directions.

The amplitude of the signals emanating from the antenna elements affects the side lobe levels, where the side lobes are lobes of the radiation pattern that are not in the direction of the main lobe. It is generally preferable to reduce side lobe levels such that the antenna system can focus the readings from the radiation pattern to a particular desired direction. As such, the precision of the relative phase and amplitude between the elements determine the precision of the beam direction and the side lobe levels, respectively. Thus, the accuracy of the control in phase shift and amplitude for the collection of antenna elements is important to the implementation of the phased array. In order to obtain the full benefit of a phased antenna array system, calibration may be performed to account and compensate for phase and amplitude variations/mismatches which may be caused by fabrication processes used to fabricate the system and/or temperature/voltage variations during operation of the system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is an illustration of a horizontal wavefront according to one embodiment of the present disclosure;

FIG. 2B is an illustration of an angled wavefront according to one embodiment of the present disclosure;

FIG. 2C is a schematic block diagram of a series of transceivers according to one embodiment of the present disclosure;

FIG. 8A illustrates an 8×8 antenna array with two probes for calibration according to one embodiment of the present disclosure;

FIG. 9 illustrates an 8×8 antenna array with one probe for calibration according to one embodiment of the present disclosure;

DESCRIPTION OF EXAMPLE EMBODIMENTS OF THE DISCLOSURE

Overview

Figure 1A:
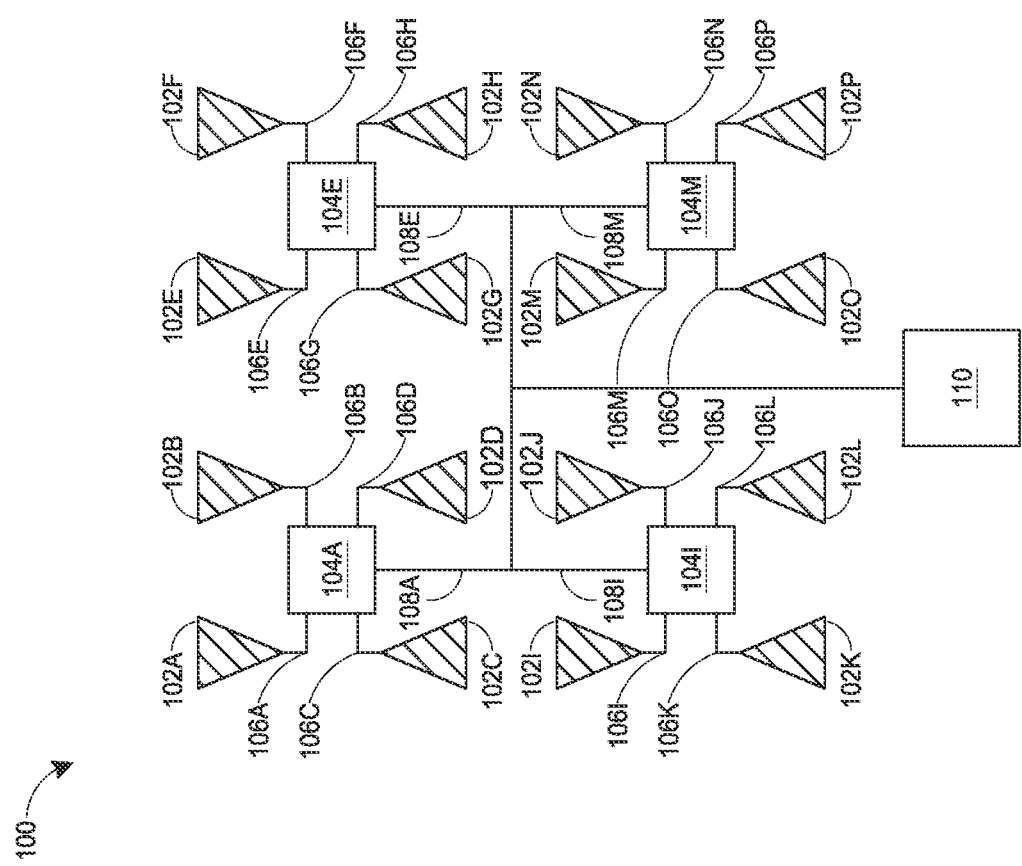
FIG. 1A is a schematic block diagram of a symmetric routing schematic for a 4-by-4 antenna array according to one embodiment of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

An antenna array can enable a beamformer to steer an electromagnetic radiation pattern in a particular direction, which generates a main beam in that direction and side lobes in other directions. The main beam of the radiation pattern is generated based on constructive inference of the signals based on the transmitted signals' phases. Furthermore, the amplitudes of the antenna elements determine side lobe levels. A beamformer can generate desired antenna patterns by, for example, providing phase shifter settings for the antenna elements. However, over time, the amplitudes of signals and the relative phases among the antenna elements can drift from the values set when the antenna was originally calibrated. The drift can cause the antenna pattern to degrade, which can, for example, reduce the gain in a main lobe.

Calibration may be used to accurately measure and control the phase and amplitude of antenna elements in an array system even after an antenna array has been fielded. Conventional calibration processes are often labor intensive, time consuming, and costly. Thus, there is a need for calibration techniques that do not require expensive test equipment and facilities and having to relocate the antenna to a particular location.

The present disclosure enables an antenna array to perform calibration using relative measurements of phase and/or absolute measurements of amplitude. A probe is placed between antenna elements and the phase and/or amplitude of the antenna elements are measured. Then, the phase or amplitude can be assessed to determine adjustments that are made to the transmitter, receiver, or transceiver connected to the antenna elements.

In some embodiments, the antenna elements can transmit signals, and the phase of one or more antenna elements can be adjusted until a relatively high or maximum and/or relatively low or minimum power level is reached. Upon determining a relatively high or maximum power level, the phase adjuster or shifter values may be recorded as those corresponding to in phase, and for a relatively low or minimum power level, the phase values may be recorded as 180 degrees out of phase. In some embodiments, the calibration data may be used by the beamformer and combined with other data, such as pre-calculated or pre-stored antenna pattern data, to generate appropriate settings for beamforming.

One aspect of the present disclosure provides an antenna apparatus for calibrating one or more of a plurality of antenna elements of an antenna array using one or more probes. Each of the probes includes a radiative element configured to wirelessly transmit and/or receive RF signals (in other words, each of the probes includes an antenna element, provided in addition to the antenna elements of the antenna array). The antenna apparatus includes an upconverter and/or downconverter (UDC) circuit (i.e., circuit that includes 1) an upconverter but no downconverter, 2) a downconverter but no upconverter, or 3) both an upconverter and a downconverter) and a calibration arrangement that includes a switching circuit. The switching circuit is configured to enable operation of the UDC in a first mode or in a second mode (i.e., the switching circuit is configured to select/control whether the UDC operates in the first mode or in the second mode). When the UDC is in the first mode (which may be referred to as a "no-probe" mode), the switching circuit ensures that the one or more probes are electrically disconnected from the UDC circuit (i.e., the UDC does not provide RF signals to or receive RF signals from any of the probes). In the no-probe mode, the UDC circuit may be idle (i.e., not performing upconversion and/or downconversion of signals), or it may be connected to at least one of the antenna elements and may provide upconverted RF signals for wireless transmission by the antenna element and/or receive and downconvert RF signals wirelessly received by the antenna element (i.e., the UDC circuit may be used in a normal operation of an antenna element). When the UDC is in the second mode (which may be referred to as a "probe" or "calibration" mode), the switching circuit connects at least one of the one or more probes to the UDC circuit. In the probe mode, the UDC circuit may provide upconverted RF signals for wireless transmission by the at least one probe connected thereto and/or receive and downconvert RF signals wirelessly received by the at least one probe connected thereto, and the calibration arrangement is configured to use the UDC circuit to perform calibration of the antenna array. Being able to use a single UDC circuit to both, support normal operation of the antenna apparatus where the UDC circuit provides RF signals to and/or receives RF signals from one or more of the antenna elements of the antenna array, and support calibration of the antenna array where the UDC circuit provides RF signals to and/or receives RF signals from one or more of the probes, as opposed to using an additional UDC circuit for calibration of the antenna array, may advantageously allow reducing design complexity, cost, and die area occupied by the antenna apparatus. Furthermore, the use of the switching circuit may eliminate the need to include additional input/output (I/O) ports on a UDC die (i.e., a die on which the UDC circuit is provided) exclusively for the purposes of performing calibration. Namely, because a typical UDC die already includes certain I/O ports to enable normal operation of a UDC circuit provided thereon, placing a switching circuit in accordance with embodiments of the present disclosure between such I/O ports of the UDC die and the UDC circuit advantageously allows using these I/O ports for normal operation of the UDC circuit in the no-probe mode and using the same I/O ports for calibration of the antenna array in the calibration mode.

In various embodiments, any number of one or more probes may be implemented, all of which being within the scope of the present disclosure. Furthermore, as used herein, a "probe" is a general term for an antenna element that may include any of conductive structures (e.g., probe lines, slots, monopoles, small patches, other coupling structures, etc.) that can wirelessly transmit and/or receive RF signals which may be used for calibration purposes as described herein.

In various embodiments, the term "UDC" may be used to include a frequency conversion circuit as such (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC" covers implementations where the UDC only includes circuit elements related to a transmit (TX) path (e.g., only an upconversion mixer but not a downconversion mixer; in such implementations the UDC may be used as/in an RF transmitter for generating RF signals for transmission, e.g., the UDC may enable a probe or an antenna element of the antenna array that is connected to the UDC to act, or be used, as a transmitter), implementations where the UDC only includes circuit elements related to a receive (RX) path (e.g., only an downconversion mixer but not an upconversion mixer; in such implementations the UDC may be used as/in an RF receiver to downconvert received RF signals, e.g., the UDC may enable a probe or an antenna element of the antenna array that is connected to the UDC to act, or be used, as a receiver), as well as implementations where the UDC includes, both, circuit elements of the TX path and circuit elements of the RX path (e.g., both the upconversion mixer and the downconversion mixer; in such implementations the UDC may be used as/in an RF transceiver, e.g., the UDC may enable a probe or an antenna element of the antenna array that is connected to the UDC to act, or be used, as a transceiver).

In various embodiments, the term "switching circuit" may include any suitable switching arrangement (e.g., any suitable combination of switches) that allows ensuring that the UDC operates in one of the first and second modes as described herein. In some embodiments, the UDC may operate in one of more than the first and second modes.

In some embodiments, the one or more probes used for calibration of the antenna array may include a probe disposed symmetrically between the antenna elements of the array. For example, if there are two antenna elements, such a probe may be placed in between the two antenna elements. In another example, if there are four antenna elements, such a probe may be placed diagonally between the four antenna elements equidistant from each of the four antenna elements. Placing such a probe symmetrically between antenna elements may reduce or eliminate the possible variation that may occur in the propagation of the radiation pattern to/from the probe and the antenna elements.

In some embodiments, the antenna elements can be used to transmit signals to the probe, the probe receiving the transmitted signals. The probe can detect power (e.g., by using a power detector) or detect both power and phase (e.g., by using a mixer). Alternatively, the probe can be used as a transmitter, transmitting a signal to the antenna elements, where the antenna elements receive the transmitted signal.

In some embodiments, the one or more probes may include a single probe because using a single probe to calibrate multiple antennas may be advantageous. Having a single probe that may be used to transmit to the antenna elements and/or receive signals from antenna elements may itself introduce variation to the signal. However, since the same probe and components connected to the probe (e.g., a mixer) are used to measure the signal, there is advantageously no part-to-part or channel-to-channel variation with the disclosed techniques. For example, the probe and the components connected to the probe may introduce the same variation to a signal received at the probe from a first and second antenna element.

By contrast, couplers used to measure phase and amplitude of a signal to calibrate antenna elements may introduce variation. A separate coupler may be connected to the transmit path of each antenna element. Then, the signal may travel along the signal route to components connected to each coupler. The routing path from each coupler to their associated connected components may introduce channel-to-channel variation. Each coupler may be connected to its own set of components, which despite possibly being of the same kind of components, the components themselves may introduce part-to-part variability. Furthermore, the couplers themselves may use additional hardware such as switches. The couplers themselves, often made of metallic substances, may interfere with the radiation signal making it harder to obtain higher isolation between the antenna elements. At least some of these drawbacks may be reduced or eliminated by embodiments of the present disclosure.

Embodiments of the present disclosure including using one or more probes disposed between antenna elements may be advantageous in that the probes may be used to calibrate the antenna array based on near-field radiation measurements. Thus, the array may be calibrated without the need for far-field measurements. Typically, electromagnetic anechoic chambers, (also called echo-free chambers) can be used to simulate an open space situation. The time and space in these chambers may be difficult to schedule, may be expensive, and time consuming. However, embodiments of the present disclosure avoid the need of having to place the antenna in an anechoic chamber because near-field measurements are used instead of far-field measurements. Furthermore, anechoic chambers may be practical for initial calibration, but not for later calibration. Some embodiments of the antenna array of the present disclosure may be calibrated repeatedly and at the field. The probes can be permanently placed in between antenna elements. The antenna array may be configured to allow temporary installment of the probes in between the antenna elements as well. Some embodiments of the near-field calibration of the present disclosure may also be helpful for small signal difference.

The calibration methods and systems described herein may be used to calibrate antenna arrays of different sizes. For example, the system can calibrate a planar array by calibrating a first set of antenna elements (or calibration group) that are equidistant to one probe, then calibrating a second set of antenna elements equidistant to another probe where the first and second set of antenna elements share at least one antenna element. Then, the shared antenna element can be used as a reference point to calibrate the other antenna elements.

As will be appreciated by one skilled in the art, aspects of the present disclosure, in particular individual aspects of performing antenna array calibration using one or more probes and a switching circuit as described herein, may be embodied in various manners—e.g., as a system (e.g., an antenna apparatus that includes a switching circuit implemented in hardware), a method (e.g., methods of calibrating antenna arrays, described herein), a computer program product (e.g., computer program products implementing methods of calibrating antenna arrays, described herein), or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing pieces of antenna apparatus and/or their controllers, etc.), or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value (e.g., +/−5-10% of the target value) based on the context of a particular value as described herein or as known in the art.

For the purposes of the present disclosure, the phrase "A and/or B" or notation "A/B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A, B, and/or C).

Antenna Element Calibration

FIG. 1A is a schematic block diagram of a symmetric routing schematic 100 according to an embodiment. The symmetric routing schematic 100 includes antenna elements, 102A, 102B, 102C, 102N, 102E, 102F, 102G, 102H, 102I, 102J, 102K, 102L, 102M, 102N, 102O, and 102P (collectively referred to herein as 102). The symmetric routing schematic 100 also includes a chip 104A, 104E, 104I, and 104M (collectively referred to herein as 104). The symmetric routing schematic 100 includes a transceiver 110 and routing paths 106A, 106B, 106C, 106D, 106E, 106F, 106G, 106H, 106I, 106J, 106K, 106L, 106M, 106N, 106O, 106P, 108A, 108E, 108I, and 108M (collectively referred to herein as 106) from the transceiver 110 to the antenna elements 102.

FIG. 1A refers to a symmetric routing schematic 100 for a 4-by-4 antenna array. The schematic refers to symmetric routing because the routes on the routing paths 106 from the transceiver 110 to the antenna elements 102 are of the same distance. For example, the routing path from transceiver 110 to antenna element 102A is a combination of the routing paths 108A and 106A, while the routing path from transceiver 110 to antenna element 102B is a combination of the routing paths 108A and 106B. The routing paths are generated to minimize variation in the distance the signal travels from the transceiver 110 to the antenna element 102. This type of configuration helps to mitigate the variation that may cause difficulties in calibration due to different lengths of routing paths the signal travels from the transceiver 110 to the antenna element 102.

The antenna elements 102 may be radiating elements or passive elements. For example, the antenna elements 102 may include dipoles, open-ended waveguides, slotted waveguides, microstrip antennas, and the like. Although some embodiments shown in the present drawings illustrate a certain number of antenna elements 102, it is appreciated that the some embodiments may be implemented on an array of two or more antenna elements.

Figure 1B:
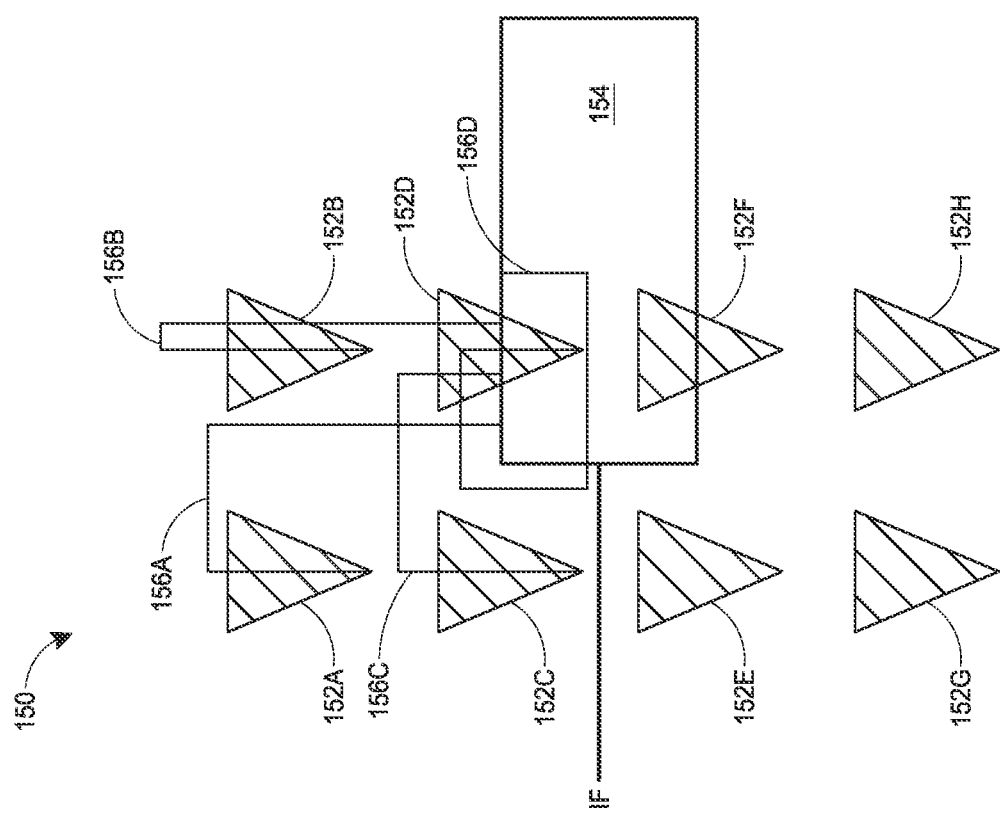
FIG. 1B is a schematic block diagram of an asymmetric routing schematic for a 2-by-8 antenna array according to another embodiment of the present disclosure.

FIG. 1B is a schematic block diagram of an asymmetric routing schematic 150 for a 2-by-4 antenna array according to another embodiment. The asymmetric routing schematic 150 includes antenna elements 152A, 152B, 152C, 152D, 152E, 152F, 152G, and 152H (collectively referred to herein as 152). The asymmetric routing schematic 150 also includes a chip 154. The asymmetric routing schematic 150 includes routing paths 156A, 156B, 156C, and 156D (collectively referred to herein as 156) from the chip 154 to the antenna elements 152. FIG. 1B is directed to asymmetric routing because the routing paths 156 from the chip 154 to the antenna elements 152 are different in lengths. Thus, the phase and amplitude varies differently from channel to channel. For example, the transmitted signal at the antenna element 152 may be different from element to element even though the same signal was transmitted from the chip 154. In some embodiments, the received signal at the antenna elements 152 may be the same, but different when received at the chip 154 as a result of the different lengths of the routing paths 156.

FIG. 2A is an illustration of a horizontal wavefront 200 according to an embodiment. Each antenna element 102 may radiate in a spherical radiation pattern. However, the radiation patterns collectively generate a horizontal wavefront 204. The illustration 200 includes antenna elements 102A, 102B, 102C, 102N, 102M−1 and 102M. The antenna elements 102A, 102B, 102C, and 102N may be arranged linearly, where the elements are arranged on a straight line in a single dimension. In this configuration, the beam may be steered in one plane. The antenna elements may also be arranged planarly, arranged on a plane in two dimensions (N direction and M direction). In this planar configuration, the beam may be steered in two planes. The antenna elements may also be distributed on a non-planar surface. The planar array may be rectangular, square, circular, or the like. It is appreciated that the antenna may be arranged in other configurations, shapes, dimensions, sizes, types, other systems that can implement an antenna array, and the like. The illustration of the horizontal wavefront 200 shows each of the antenna elements 102 transmitting a signal 202A, 2026, 202C, 202N, 202M-1, and 202M (collectively referred to herein as 202) creating a horizontal wavefront 204. The illustration of FIG. 2A illustrates an antenna array creating a main beam that points upward, as shown by the horizontal wavefront 204. The phases from the antenna elements 102 are constructively interfering in the upward direction.

FIG. 2B is an illustration of an angled wavefront 220 according to an embodiment. The illustration of the angled wavefront 220 includes antenna elements 102A, 102B, 102C, 102N, 102M−1 and 102M. The antenna elements may be arranged similarly to that described for FIG. 2A. The illustration of an angled wavefront 220 shows the antenna elements 102 transmitting a signal 222A, 222B, 222C, 222N, 222M-1, and 222M (collectively referred to herein as 222) creating a wavefront 224 that propagates at an angle, different from the direction of the wavefront 204 in FIG. 2A. The phases of the signals 222 are constructively interfering in the direction that the angled wavefront 220 is traveling (e.g., up-right direction). Here, each of the phases of the antenna elements 102 may be shifted by the same degree to constructively interfere in a particular direction.

The antenna elements 102 can be spaced apart equidistant from one another. In some embodiments, the antenna elements 102 are spaced at different distances from each other, but with a probe equidistant from at least two antenna elements 102.

Although the disclosure may discuss certain embodiments as one type of antenna array, it is understood that the embodiments may be implemented on different types of antenna arrays, such as time domain beamformers, frequency domain beamformers, dynamic antenna arrays, antenna arrays, passive antenna arrays, and the like.

FIG. 2C is a schematic block diagram of a series of transceivers 240A, 240B, 240N (collectively referred to herein as 240) according to an embodiment. In some embodiments, a single transceiver 240 feeds to a single antenna element 102. However, it is appreciated that a single transceiver 240 may feed to multiple antenna elements 102, or a single antenna element 102 may be connected to a plurality of transceivers 240. Furthermore, it is appreciated that the antenna element 102 may be linked to a receiver and/or a transmitter.

In some embodiments, the transceiver 240 may include a switch 242A, 2426, 242N (collectively referred to herein as 242) to switch the path from the antenna element 102 to the receiver or the transmitter path. The transceiver 240 includes another switch 248A, 248B, 248N (collectively referred to herein as 248) that switches the path from the signal processor (not shown) to the receiver or the transmitter path. The transmitter path has a phase adjuster 244A, 244B, 244N (collectively referred to herein as 244) and a variable gain amplifier 246A, 246B, 246N (collectively referred to herein as 246). The phase adjuster 244 adjusts the phase of the transmitted signal at the antenna element 102 and the variable gain amplifier 246 adjusts the amplitude of the transmitted signal at the antenna element 102. Although the embodiments describe the transceiver 240 including a phase adjuster 244 and a variable gain amplifier 246, other components can be used to adjust the magnitude of the signal and/or the phase of the signal. Furthermore, although a switch is shown to switch from the transmitter path to the receive path, other components can be used, such as a duplexer.

The receiver path may also have a phase adjuster 250A, 250B, 250N (collectively referred to herein as 250), and a variable gain amplifier 252A, 252B, 252N (collectively referred to herein as 252). The phase adjuster 250 and the variable gain amplifier 252 can be used to adjust the received signal from the antenna element 102 before going to the signal processor (not shown).

Figure 2D:
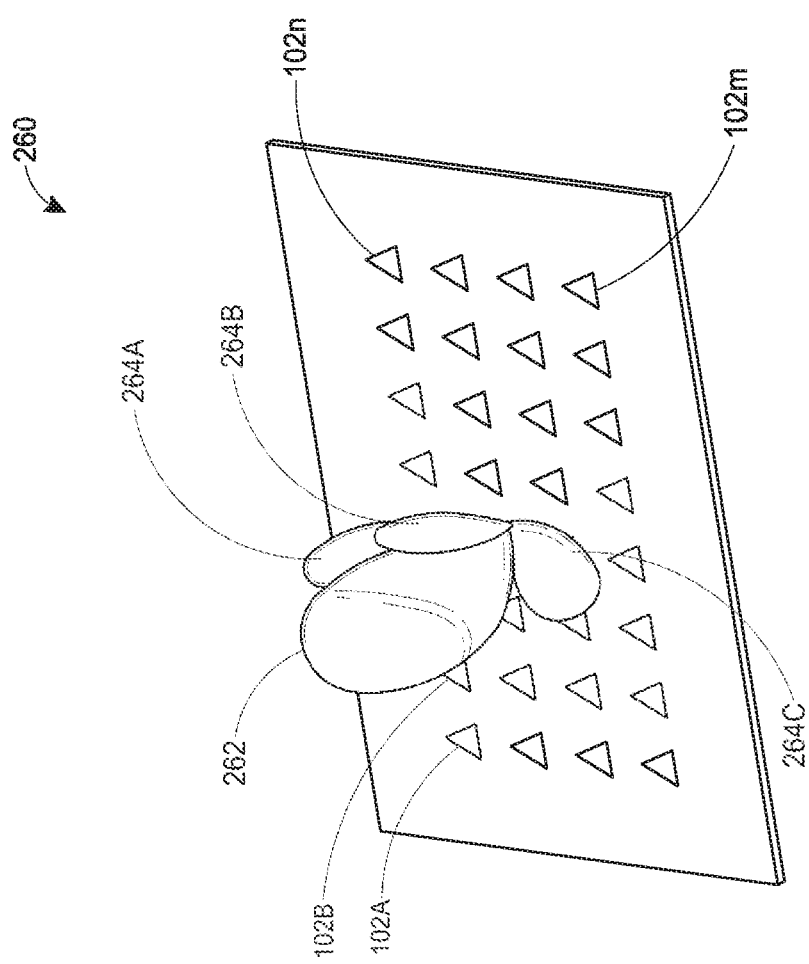
FIG. 2D is an illustration of a planar array and an associated electromagnetic pattern according to one embodiment of the present disclosure.

FIG. 2D is an illustration of a planar phased array 260 and an associated electromagnetic pattern according to an embodiment. FIG. 2D includes antenna elements 102A, 102B, 102N, 102M−1, and 102M. FIG. 2D also includes a beam pattern with a main beam 262, and side lobes 264A, 264B, 264C. The antenna elements 102 are transmitting a signal where the phase of the signal is constructively interfering in the direction of the main beam 262. The precision of the amplitude of the antenna elements 102 controls the side lobe levels. For example, the more uniform the amplitudes of the transmitted signals from the antenna elements 102 are, the lower the side lobe levels will be. The antenna elements 102 may be disposed on a single die, or multiple dies.

Figure 3A:
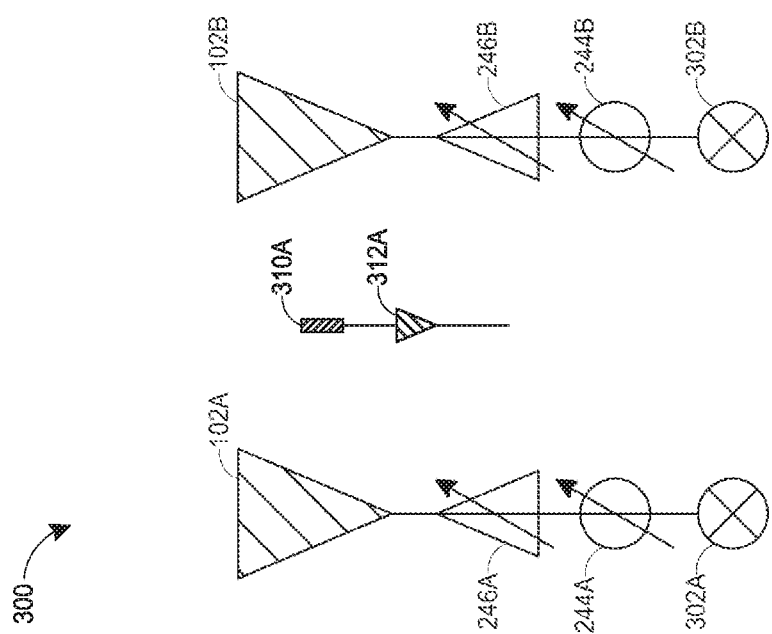
FIG. 3A is a schematic block diagram of a probe with a power detector disposed between two antenna elements according to one embodiment of the present disclosure.

FIG. 3A is a schematic block diagram 300 of a probe 310A with a power detector 312A disposed between two antenna elements 102A, 102B according to an embodiment. In this block diagram 300, the probe is disposed equidistant between the two antenna elements 102A, 102B. The probe 310A may be a slot, a probe, a coupling element, any component that can be used to detect signals, or the like. The probe can be used as a transmitter.

Figures 1, 3B:
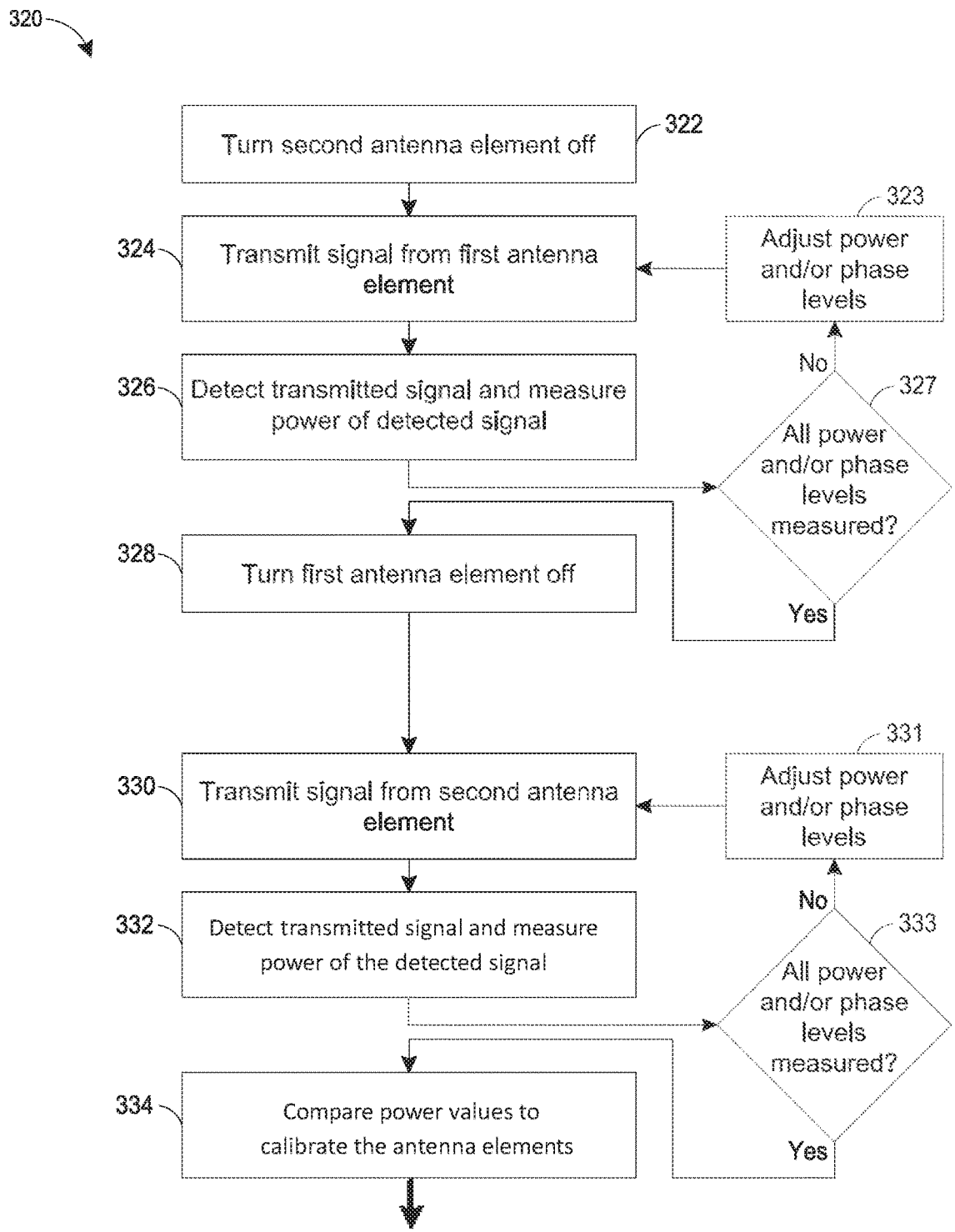
FIGS. 3B-1 and 3B-2 are flow diagrams for calibration using a probe with a power detector disposed between two antenna elements according to one embodiment of the present disclosure.
Figures 2, 3B:
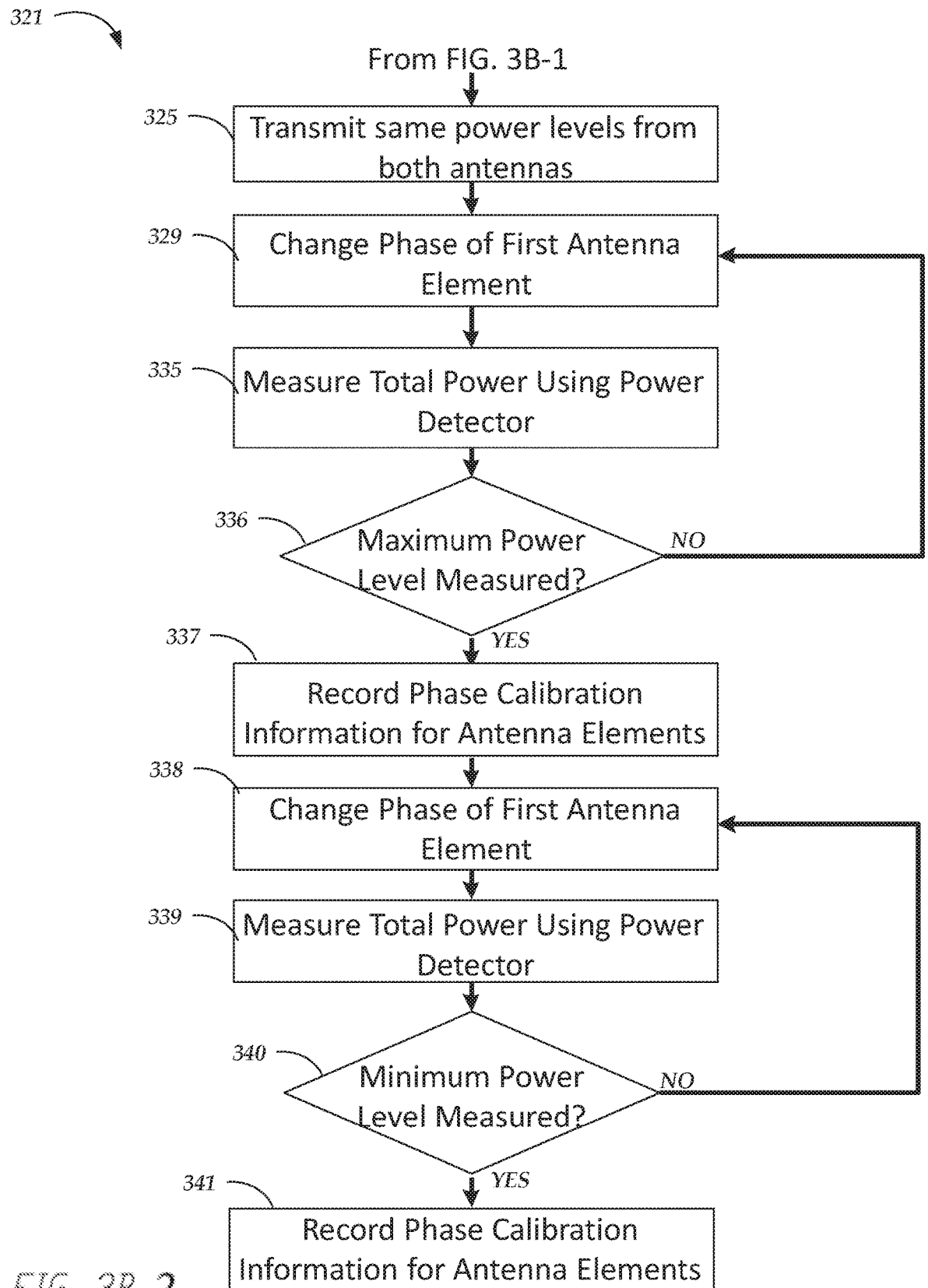

FIGS. 3B-1 and 3B-2 is a flow diagram for calibration using a probe with a power detector disposed between two antenna elements according to an embodiment.

FIG. 3B-1 illustrates a flow diagram 320 for measuring and comparing all power levels for the two antenna elements 102A, 102B. At block 322, the transmitter tied to the antenna element 102B is turned off. At block 324, a signal is transmitted from the first antenna element 102A. A signal is generated from the mixer 302A, amplified by the variable gain amplifier 246A, shifted in phase by the phase adjuster 244A, and transmitted from the antenna element 102A. At block 326, the probe 310A detects the transmitted signal from the antenna element 102A and the power detector 312A detects power values of the detected signal. At block 327, the system can determine whether all power and/or phase levels are measured. If yes, then the system can continue to block 328. If not, then the power and/or phase can be adjusted in block 323, and proceed back to block 324. For example, a combination of each power level and each phase level can be measured. In some embodiments, the phase and amplitude are decoupled such that each power level can be measured and each phase level measured independently without having to measure every combination of each power level and each phase level.

At block 328, the transmitter tied to the antenna element 102A is turned off. At block 330, a signal is transmitted from the second antenna element 102B. A signal is generated from the mixer 302B, amplified by the variable gain amplifier 246b, shifted in phase by the phase adjuster 244b, and transmitted from the antenna element 102B. At block 332, the probe 310A detects the transmitted signal from the antenna element 102B and the power detector 312A detects power values of the detected signal.

At block 334, once the detected signals from the transmitted signals of antenna elements 102A and 102B are stored, the power values are compared to calibrate the transmitter connected to the antenna element 102A relative to the transmitter connected to the antenna element 102B, and/or vice versa. The power values are calibrated by adjusting the gain of the variable gain amplifier 246A and/or 246b. In some embodiments, the calibration is performed during, before, or after other blocks in FIG. 3B. After comparing power values to calibrate the antenna elements at block 334, the flow can continue to FIG. 3B-2.

FIG. 3B-2 illustrates a flow diagram 321 for calibrating the phase for the two antenna elements 102A, 102B. At block 325, a signal of the same power level is transmitted from both antenna elements 102A, 102B. This can be achieved using data obtained from the steps in FIG. 3B-1. At block 329, the phase of the first antenna element 102A is changed. Then at block 335, the total power can be measured by a power detector 312A. The system determines whether the maximum power level is measured at block 336. If not, then the system continues to change the phase of the first antenna element 102A and continues the flow diagram from block 329. If the maximum power level is measured at block 336, then the phase can be determined to be in an in-phase condition. The phases that provide the maximum power level at block 336 is recorded for the antenna elements at block 337.

At block 338, the phase of the first antenna element 102A is changed, and at block 339, the total power is measured using the power detector 312A. At block 340, the system determines whether the minimum power level is measured. If not, then the phase of the first antenna element 102A is changed and the flowchart continues from block 338. If the minimum power level is measured, then the system records the phase calibration information for the antenna elements at block 341. This can be considered a 180 degrees out of phase condition.

Figure 3C:
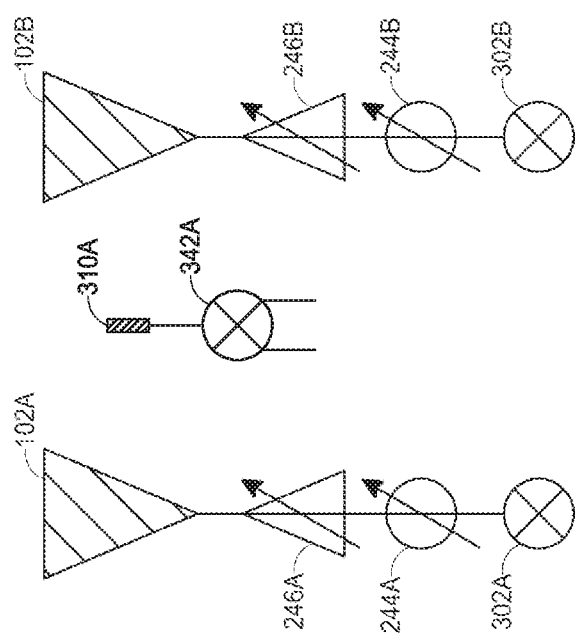
FIG. 3C is a schematic block diagram of a probe with a mixer disposed between two antenna elements according to one embodiment of the present disclosure.

FIG. 3C is a schematic block diagram 330 of a probe 310A with a mixer 342A disposed between two antenna elements 102A, 102B according to an embodiment. The probe 310A may be disposed equidistant from the antenna elements 102A and 102B. The probe 310A is connected to the mixer 342A.

Figure 3D:
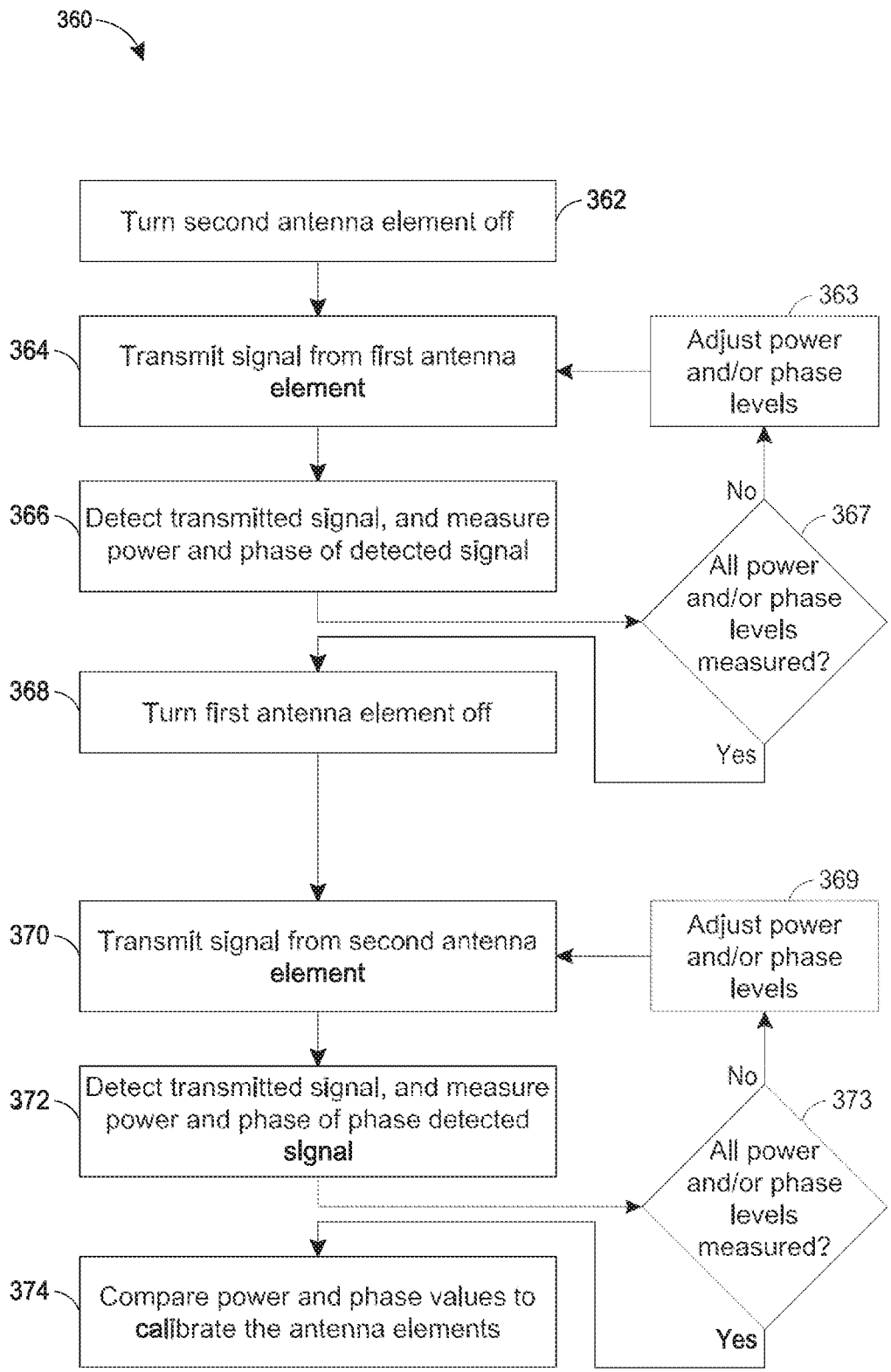
FIG. 3D is a flow diagram for calibration using a probe with a mixer disposed between two antenna elements according to one embodiment of the present disclosure.

FIG. 3D is a flow diagram 360 for calibration using a probe with a mixer disposed between two antenna elements according to an embodiment. The mixer can be used to measure phase and/or amplitude. At block 362, the transmitter connected to antenna element 102B is turned off. At block 364, a signal is generated from the mixer 302A, amplified by the variable gain amplifier 246A, phase shifted by the phase adjuster 244A, and transmitted by the antenna element 102A. At block 366, the probe 310A detects the transmitted signal and using the mixer, the signal processor measures and records the amplitude and phase values. At block 367, the system can determine whether all power and/or phase levels have been measured. If yes, then the system can proceed to block 368. If no, then the system can adjust power and/or phase levels in block 363, and return to block 324.

At block 368, the transmitter connected to the antenna element 102A is turned off. At block 370, a signal is generated from the mixer 302B, amplified by the variable gain amplifier 246B, shifted in phase by the phase adjuster 244B, and transmitted by the antenna element 102B. At block 372, the probe 310A detects the signal, the mixer mixes the signal, and the signal processor measures and records the phase and amplitude values. At block 373, the system can determine whether all power and/or phase levels have been measured. If yes, then the system can proceed to block 374. If no, then the system can adjust power and/or phase levels in block 369, and return to block 370.

At block 374, based on a comparison between the amplitudes of the signals transmitted by the antenna element 102A and 102B, the variable gain amplifiers 246A, 246B are adjusted such that the amplitudes are calibrated to transmit substantially the same power based on the same signal generated. Furthermore, based on a correlation between the phases of the signals transmitted by the antenna element 102A and 102B, the phase adjusters 244A and 244B are adjusted such that the phases are calibrated to transmit at substantially the same phase for the same generated signal.

The values of the variable gain amplifier 246A, 246B and/or the phase adjusters 244A, 244B may be controlled using a digital command sent through the beam steering interface, such as the beam steering chip or the signal processor. The phase adjuster may be an n-bit phase adjuster providing control of the phase in a total of a particular number of phase degrees. Thus, the calibration process may be calibrated to be the state that allows for the closest phase value. In some embodiments, the calibration is performed during, before, or after other blocks in FIG. 3D.

Figure 4:
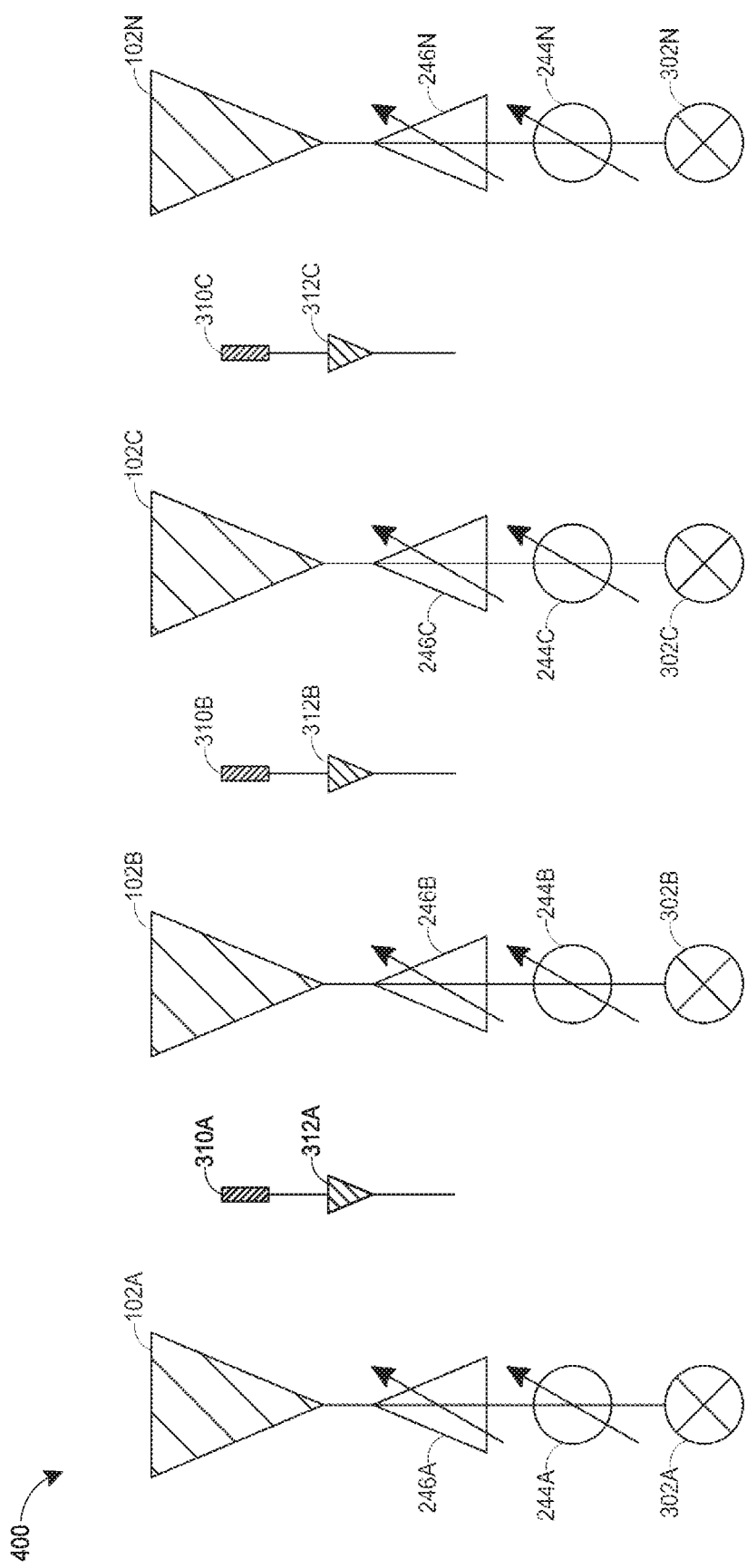
FIG. 4 is a schematic block diagram of probes disposed between four antenna elements according to one embodiment of the present disclosure.

FIG. 4 is a schematic block diagram 400 of probes 310A, 310B, 310C disposed between four antenna elements 102A, 102B, 102C, 102N according to an embodiment. In the block diagram 400, probe 310A is disposed equidistant from antenna element 102A and antenna element 102B. The probe 310B is disposed equidistant from antenna element 102B and antenna element 102C. The probe 310C is disposed equidistant from antenna element 102C and antenna element 102N. The antenna elements 102A, 102B, 102C, and 102N are disposed linearly.

In this embodiment, antenna elements 102A and 102B are calibrated first. The transmitters connected to the antenna elements 102B, 102C, and 102N are turned off. The mixer 302A generates a signal, the signal shifted in phase by the phase adjuster 244A, the signal amplified by a variable gain amplifier 246A, and transmitted from the antenna element 102A. The probe 310A receives the signal. Next, the antenna 102B transmits a signal that the same probe 310A detects. In this embodiment, the probe 310A is connected to a power detector 312A. Antenna elements 102A and 102B are calibrated similar to the process described in FIG. 3A. However, the probe 310A may be connected to mixers and may be calibrated similar to the process described in FIG. 3B. Other ways of calibration are possible. For example, other components may be connected to the probe 310A to measure phase and/or amplitude. Furthermore, other methods of calibration may be used using relative measurements of phase and/or amplitude.

Next, antenna elements 102B and 102C are calibrated. Then, 102C and 102N are calibrated. In this embodiment, the calibration occurs serially. However, calibration may occur in different time steps. For example, when antenna element 102B is transmitting a signal to calibrate with antenna 102A, not only can probe 310A be detecting the signal, but also probe 310B may detect the signal. Thus, while antenna elements 102A and 102B are being calibrated, the calibration between antenna elements 102B and 102C can begin in parallel. In this embodiment, neighboring antenna elements are being calibrated. However, it is appreciated that any set of antenna elements that are equidistant from the probe can be calibrated. For example, the first and fourth antenna element 102A, 102N can be calibrated with a probe 310B between the second and third antenna element 102B, 102C.

Figure 5A:
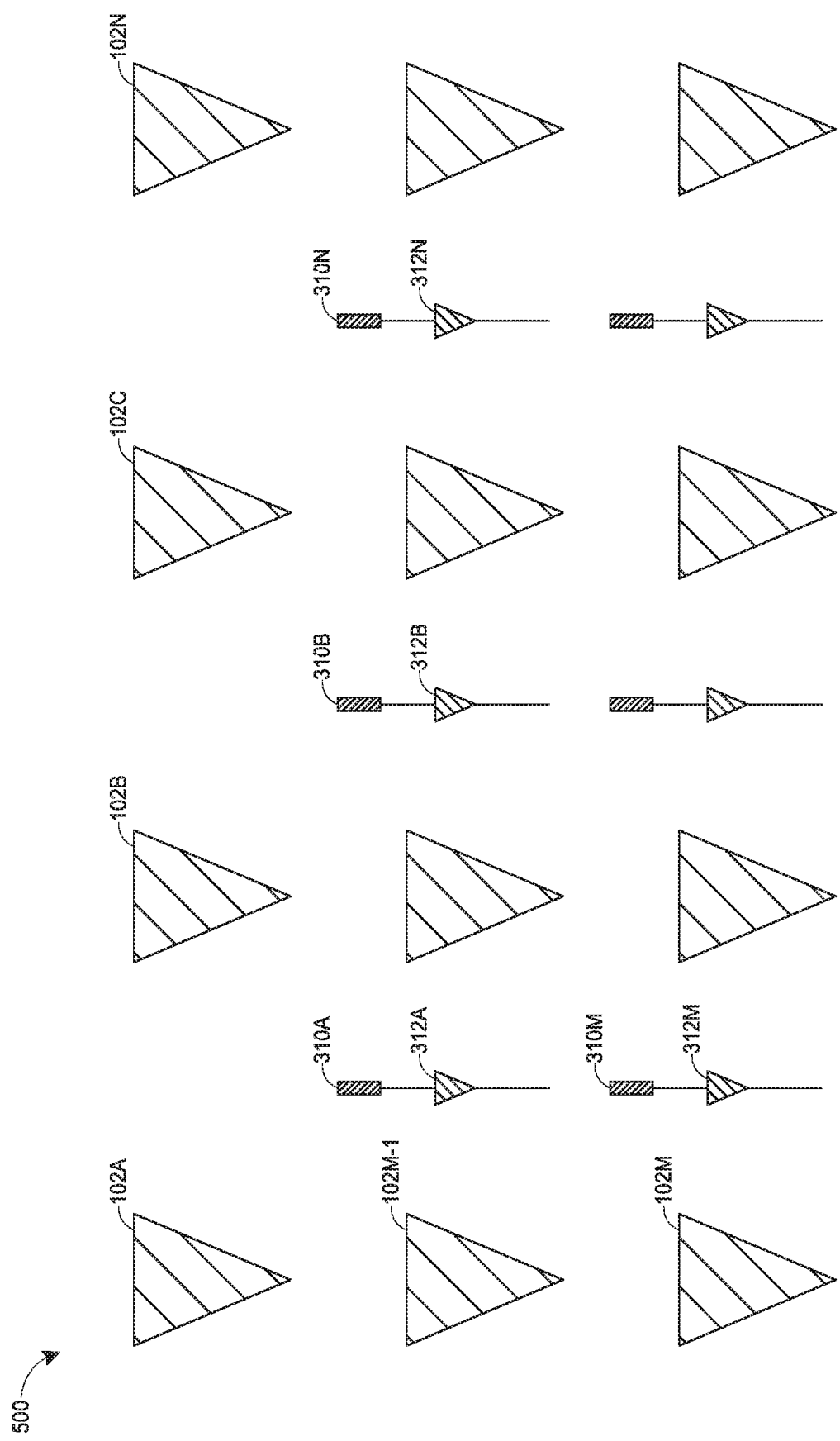
FIG. 5A is a schematic block diagram of probes disposed between an array of three by four antenna elements according to one embodiment of the present disclosure.

FIG. 5A is a schematic block diagram of probes disposed between an array of three by four antenna elements according to an embodiment. The probes 310A, 310B, 310C . . . 310M (collectively referred to herein as 310) are disposed symmetrically between a set of four antenna elements 102. In this embodiment, the probe 310 is equidistant from each antenna element 102 in the set of four antenna elements. However, it is appreciated that the probe 310 may be placed at some distance that is equidistant from at least two antenna elements 102.

Figure 5B:
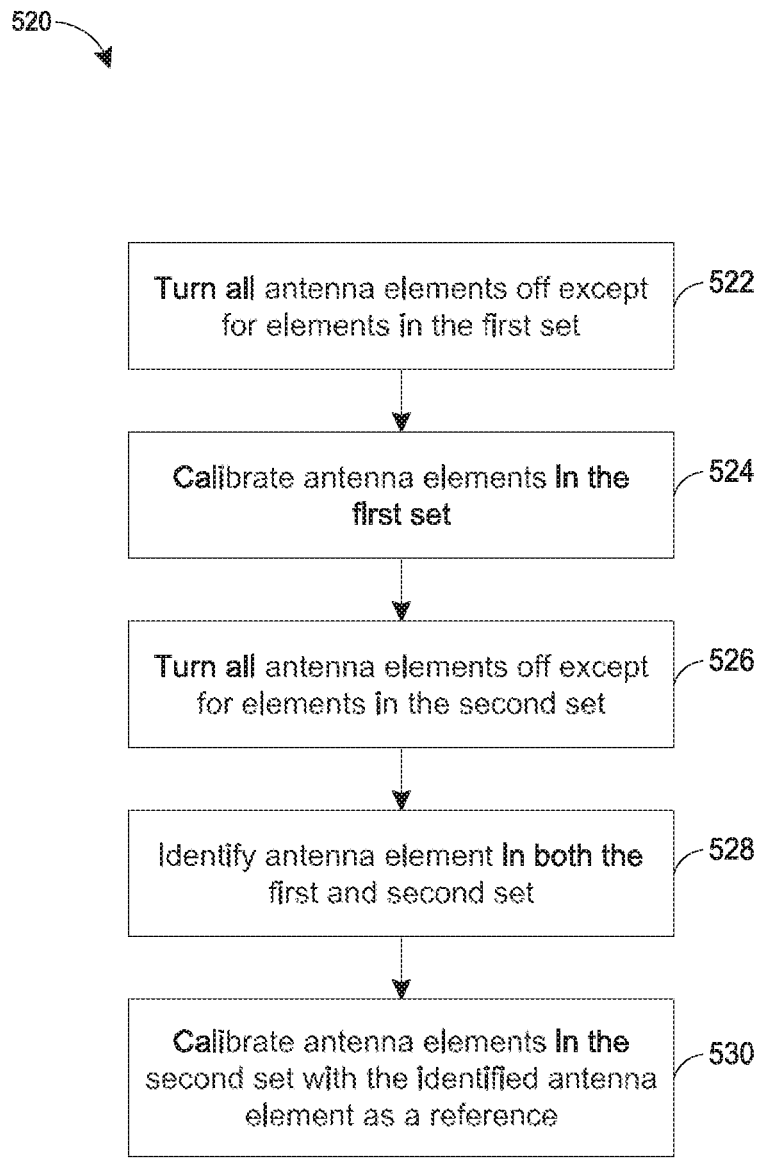
FIG. 5B is a flow diagram for calibration using probes disposed between an array of three by four antenna elements according to one embodiment of the present disclosure.

FIG. 5B is a flow diagram for calibration using probes disposed between an array of three by four antenna elements according to an embodiment.

At block 522, all transmitters connected to all antenna elements 102 are turned off. At block 524, the first set of four antenna elements is calibrated together. Then, the first antenna element 102A transmits a signal. The probe 310A receives this signal, measures the power using the power detector 312A, and records the power. This is repeated for the other three antenna elements 102 that are equidistant from the first probe 310A. Then, the gain of each antenna element 102 within the set of four antenna elements is adjusted to be calibrated in relation to one another. Then, all four antenna elements 102 transmit a signal, the phase adjusted, and the phase recorded to identify the phase configurations that provide maximized power (e.g., the phase values are equal). The same test is performed for when the power is minimized (e.g., phases are 180 degrees apart). Calibration can be performed in a similar manner to that described in FIG. 3A, 3B, and other ways described in this disclosure.

Although the disclosure may discuss certain embodiments as calibrating four antennas at once, it is understood that the embodiments may be implemented using a different number of transmitters, antenna elements, probes, and the like. For example, the power can be calibrated for four antenna elements at once (e.g., once power is recorded for four antenna elements, the gain for each of the four antenna elements can be adjusted to meet a reference gain value), while the phase can be calibrated in pairs (e.g., calibrate antenna elements 102A and 102B first, then calibrate antenna elements 102A and 102M-1 next).

After the antenna elements 102 within the set of four antenna elements have been calibrated in reference to one another, the calibration procedure may calibrate the next set of four antenna elements 102. Antenna elements except for the antenna elements in the next set are turned off at block 526. At block 528, an antenna element that is in both the first and second set is identified. Then at block 530, the next set of antenna elements are calibrated with the identified antenna element as a reference. The next set of four antenna elements 102 may be equidistant from the next probe 310б. The same or a different calibration method may be used for the next set of four antenna elements 102. After the sets of antenna elements 102 across the row of elements are calculated, the process can be repeated for the following column of a set of four antenna elements 102. For example, after the set of antenna elements 102 have been calibrated using the probes 310A, 310б, and 310C, then the next set of four antenna elements 102 to be calibrated may be those that are equidistant from the probe 310M.

Once the power values are calibrated, the transmitter connected to the antenna element 102A and the transmitter connected to the antenna element 102B are turned on. Based on the power calibration, the antenna elements 102A and 102B transmit signals at substantially the same power level. Adjust one or both of the phase adjuster 244A or 244B. The probe 310A will receive both signals from antenna elements 102A and 102B and detect the power values at the power detector 312A. When the power is maximized, the phase adjuster 244A and 244B are aligned (e.g., the phase values are equal). When the power is minimized, the phase adjuster 244A and 244B are opposite (e.g., phase of one equals the phase of the other plus 180 degrees). Using this relative relationship, the system can calibrate the phase of one antenna element relative to the other antenna element.

Figure 6A:
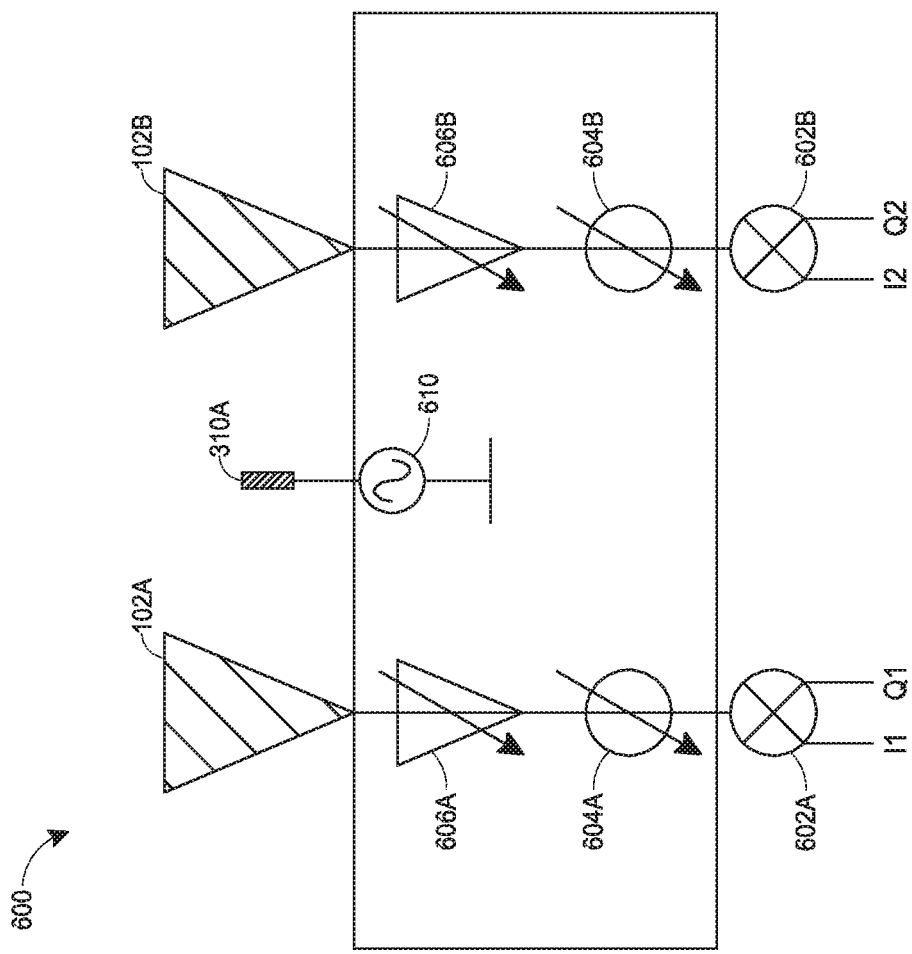
FIG. 6A is a schematic block diagram of a probe with an RF power source disposed between two antenna elements according to one embodiment of the present disclosure.

FIG. 6A is a schematic block diagram of a probe 310A with an RF power source 610 disposed between two antenna elements 102A, 102B according to an embodiment. In this block diagram 600, the probe 310A is disposed equidistant between the two antenna elements 102A, 102B. The probe 310A may transmit a signal for the antenna elements 102A and 102B to receive.

Figure 6B:
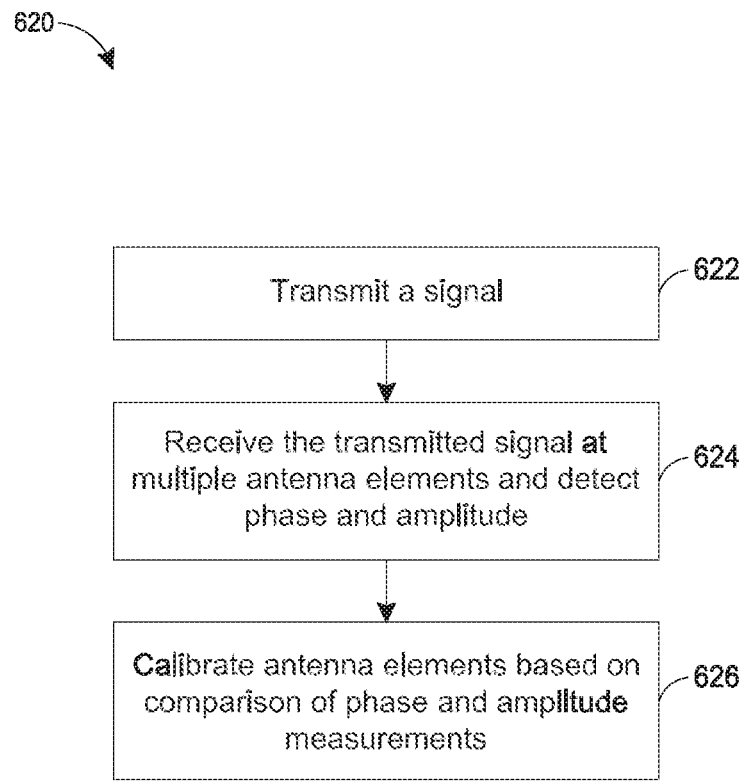
FIG. 6B is a flow diagram for calibration using a probe with an RF power source disposed between two antenna elements according to one embodiment of the present disclosure.

FIG. 6B is a flow diagram for calibration using a probe with an RF power source disposed between two antenna elements according to an embodiment. At block 622, the probe 310A is a radiating element that transmits a signal. The probe 310A can be connected to an RF power source 610. At block 624, the antenna elements 102A, 102B receives the signal transmitted from the probe 310A. The antenna elements 102A, 102B can be connected to a phase adjuster 604A and 604B, the variable gain amplifier 606A, 606B, and an I/Q mixer 602A, 602B. The antenna elements 102A, 102B receives the signal and detects the phase and amplitude using the I/Q mixer 602A, 602B. At block 626, the antenna elements are calibrated based on a comparison of the detected phase and amplitude measurements.

Antenna Element Relative Calibration

This disclosure provides systems and methods for calibration of antenna arrays, such as, but not limited to, fifth generation cellular technology (5G) phased antenna arrays. In some embodiments, systems and methods of the present disclosure include relative calibration between probes and antenna elements (e.g., patches), between a plurality of antenna elements of an antenna array, and/or between antenna elements of different arrays. With such calibration, the number of probes for performing relative calibration can be reduced relative to other methods of antenna array calibration and/or the number of probe inputs/outputs ports can be reduced for the antenna array chip comprising the antenna array and the probe relative to other methods of antenna array calibration. Antenna element calibration discussed herein can involve calibrating a transmit path associated with an antenna element and/or calibrating a receive path associated with the antenna element. The transmit path can include an upconverter and a transmit beamformer. The receive path can include a downconverter and a receive beamformer.

The calibration discussed with reference to FIGS. 7 to 17 can provide a number of advantages relative to other technology. For example, calibration discussed herein can be performed with real data from intermediate frequency and/or baseband ports for accurate calibration over frequency. Upconverter and/or downconverter circuitry can be used for calibration such that a dedicated observation path for calibration can be omitted. A local oscillator signal is not directly coupled to a probe in embodiments discussed herein. This can mitigate local oscillator leakage risk. A dynamic range specification for an analog-to-digital converter for calibration can be reduced in certain embodiments.

Calibration can be implemented with a relatively small amount of dedicated calibration hardware. For example, a loop back input can be provided to a downconverter before a downconverting mixer, a coupler output to the upconverter can be included after an upconverting mixer, and switch(es) to the probe(s) can be included in an antenna system for calibration.

Embodiments discussed herein use an upconverter and/or a downconverter with an additional output port and/or input port to calibrate a phase antenna array at the system level. Such a system can include upconverter/downconverter circuitry, beamformer circuitry, and an antenna array that includes antenna elements and probe(s). Calibration described herein can be performed using embedded probe(s) in an antenna array. The probe(s) can be excited by ports from upconverter/downconverter circuitry though a beamformer.

Figure 7:
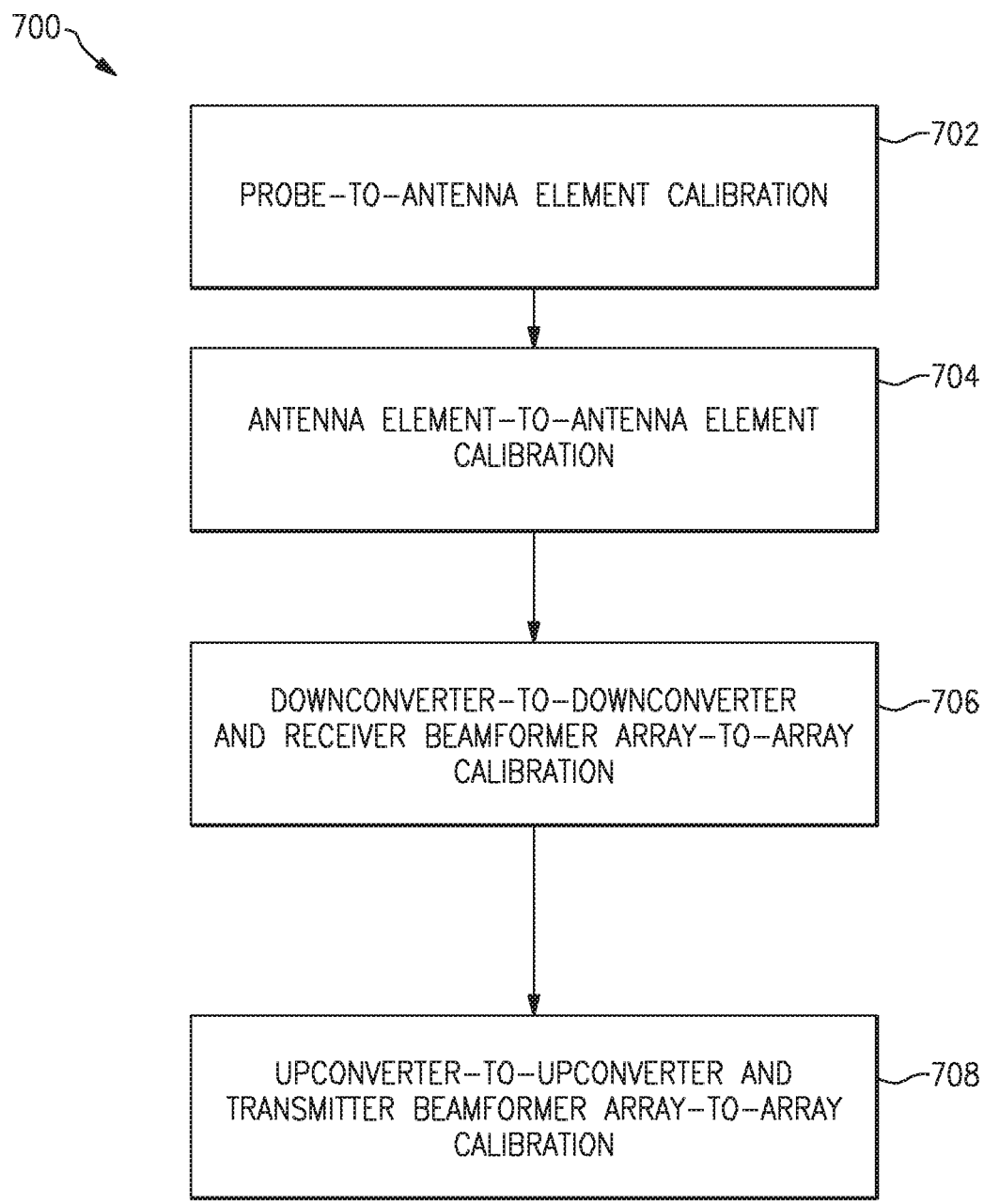
FIG. 7 is a flow diagram for a process of calibration between a probe and antenna elements, between antenna elements, and between antenna arrays according to one embodiment of the present disclosure.

FIG. 7 is a flow diagram for a process 700 of calibration between a probe and antenna elements, between antenna elements, and between antenna arrays according to an embodiment. At block 702, one or more probes disposed substantially equidistant to two antenna elements of an array of antenna elements can be used to calibrate the two antenna elements relative to each other. For example, a probe can transmit one or more signals that can be received by two antenna elements. Based on observations of the received signals (e.g., the power and/or phase measurements of the one or more signals received at the antenna elements), a programmable amplifier and/or phase shifters corresponding to one or more of the two antenna elements can be adjusted to calibrate the receive path for the two antenna elements relative to each other due to the shared transmit path to the probe. The two antenna elements can each transmit a signal received by a probe. Based on observations of the received signals (e.g., the power and/or phase measurements of the one or more signals received at the probe), the programmable amplifier and/or phase shifter corresponding to one or more of the two or more antenna elements can be adjusted to calibrate the transmit path for the two antenna elements relative to each other due to the shared receive path of the probe. Accordingly, both the transmit and receive paths for the two antenna elements can be calibrated relative to each other. In some embodiments, the probe signal can be received by more than two antenna elements and/or signals transmitted by more than two antenna elements can be received by the probe for relative calibration.

Probe to antenna element calibration can be implemented in accordance with any suitable principles and advantages discussed herein, such as any suitable principles and advantages discussed with reference to one or more of FIGS. 1A to 6B.

At block 704, where the antenna elements are substantially equidistant (e.g., equidistant or approximately equidistant) from each other, other antenna elements can be calibrated based on the two antenna elements calibrated relative to each other. For example, a first antenna element of the two antenna elements can transmit a signal. The transmitted signal can be received by a second antenna element of the two antenna elements and also received by a third antenna element. The received signal can be used to calibrate the receive path of the second and third antenna elements relative to each other. In some embodiments, the first and third antenna elements can each transmit a signal to the second antenna element. Based on observations of the received signals (e.g., measurements of phase and/or amplitude of the received signals at the second antenna element from the first and third antenna elements), the transmit path for the first and third antenna elements can be calibrated relative to each other. Advantageously, the number of probes can be reduced with the operations at blocks 702 and 704 relative to other calibration methods.

At block 706, array to array relative calibration can be performed for downconverters and/or receive beamformers in receive paths. For example, a first antenna element of the first array can be substantially equidistant to a second antenna element of the first array and a third antenna element of the second array. The first antenna element and the second antenna element of the first array can be calibrated relative to each other. The first antenna element of the first array can transmit a signal, the signal received by the second antenna element of the first array and the third antenna element of the second array. Based on observations of the received signals, receive paths for the second antenna element of the first array and the third antenna element of the second array can be calibrated relative to each other. In some embodiments, an array can include one or more subarrays.

At block 708, array to array relative calibration can be performed for upconverters and/or transmit beamformers in transmit paths. For example, a first antenna element of the first array can be at substantially equidistant to a second antenna element of the first array and a third antenna element of the second array. The first antenna element and the second antenna element of the first array can be calibrated relative to each other. The second antenna element of the first array and the third antenna element of the second array can each transmit a signal, the signal received by the first antenna element of the first array. Based on observations of the received signals, the transmit paths for the second antenna element of the first array and the third antenna element of the second array can be calibrated relative to each other. The operations 706 and 708 can be performed in any order as suitable.

Advantageously, relative calibration can be performed for antenna elements of the same array and/or antenna elements across different antenna arrays. In some embodiments, the relative calibration can be performed with a relatively small amount of dedicated calibration hardware. For example, a coupler and a switch can be used for transmitting and/or receiving the signals to the probes. Advantageously, the relative calibration disclosed herein can reduce the analog-to-digital converter dynamic range requirement for calibration. In some embodiments, the local oscillator (LO) signal is not directly coupled to the probes for calibration, mitigating LO leakage. Furthermore in some embodiments, the up and down converter circuitry may be unmodified for the relative calibration.

Any antenna element discussed herein can be implemented by any suitable antenna element for performing signal transmission and/or reception. In some embodiments, an antenna element can include a patch, a radiator of the antenna array, an antenna, a dipole, and/or the like. For example, an antenna array can include 8×8 radiators, whereby each radiator is relatively calibrated to at least one other radiator using the process 700 described above. A probe can include any suitable element for performing signal transmission and/or reception, such as a patch, a radiator, an antenna, a dipole, and/or the like. The probe can be connected to the upconverter and/or downconverter without an intervening beamformer. The probe can be suitable for calibration applications. The probe may not be suitable for typical transmission and reception with the entire antenna array.

Antenna Element Relative Calibration for Antenna Array Using Two Probes

Figure 8A:
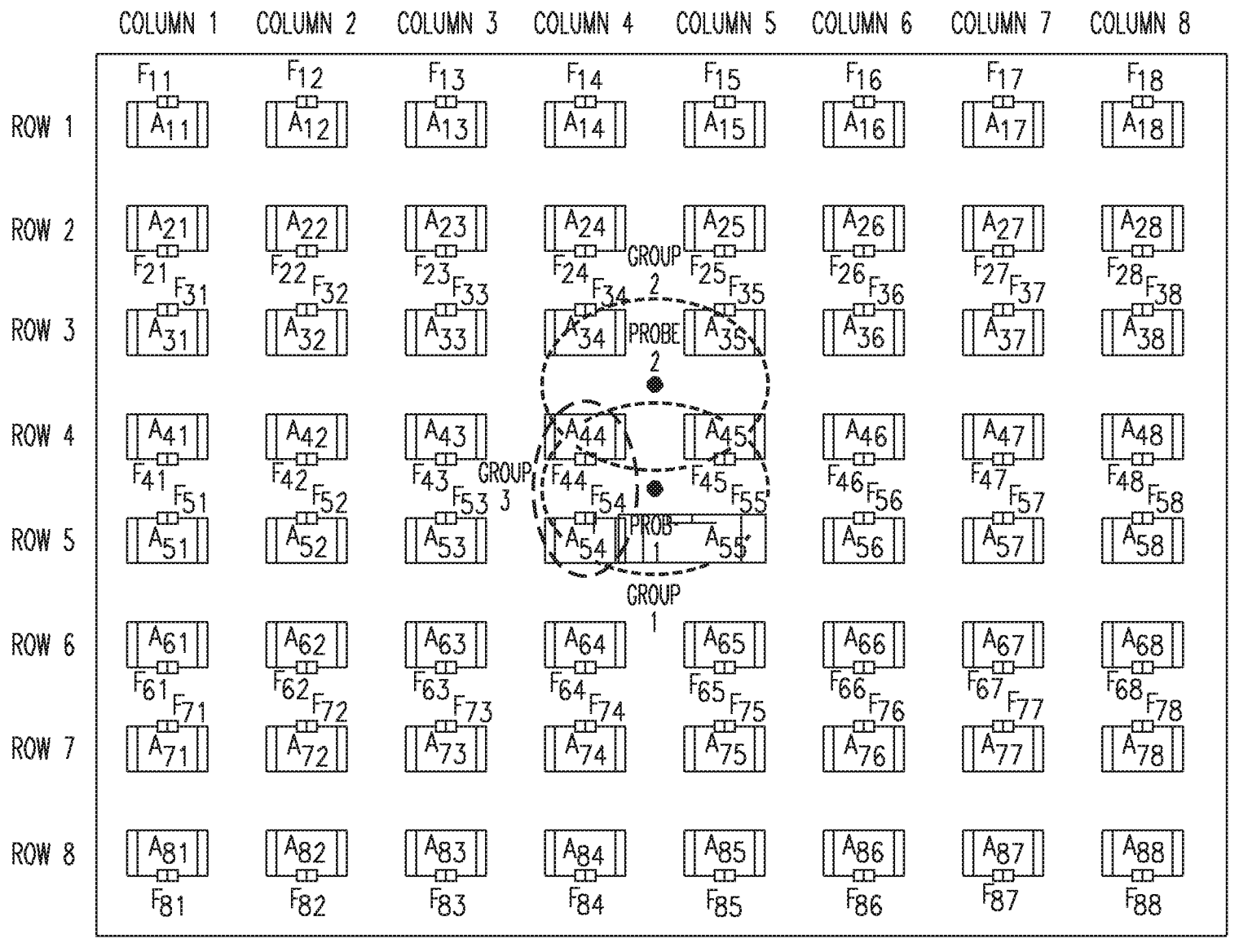
Figure 8B:
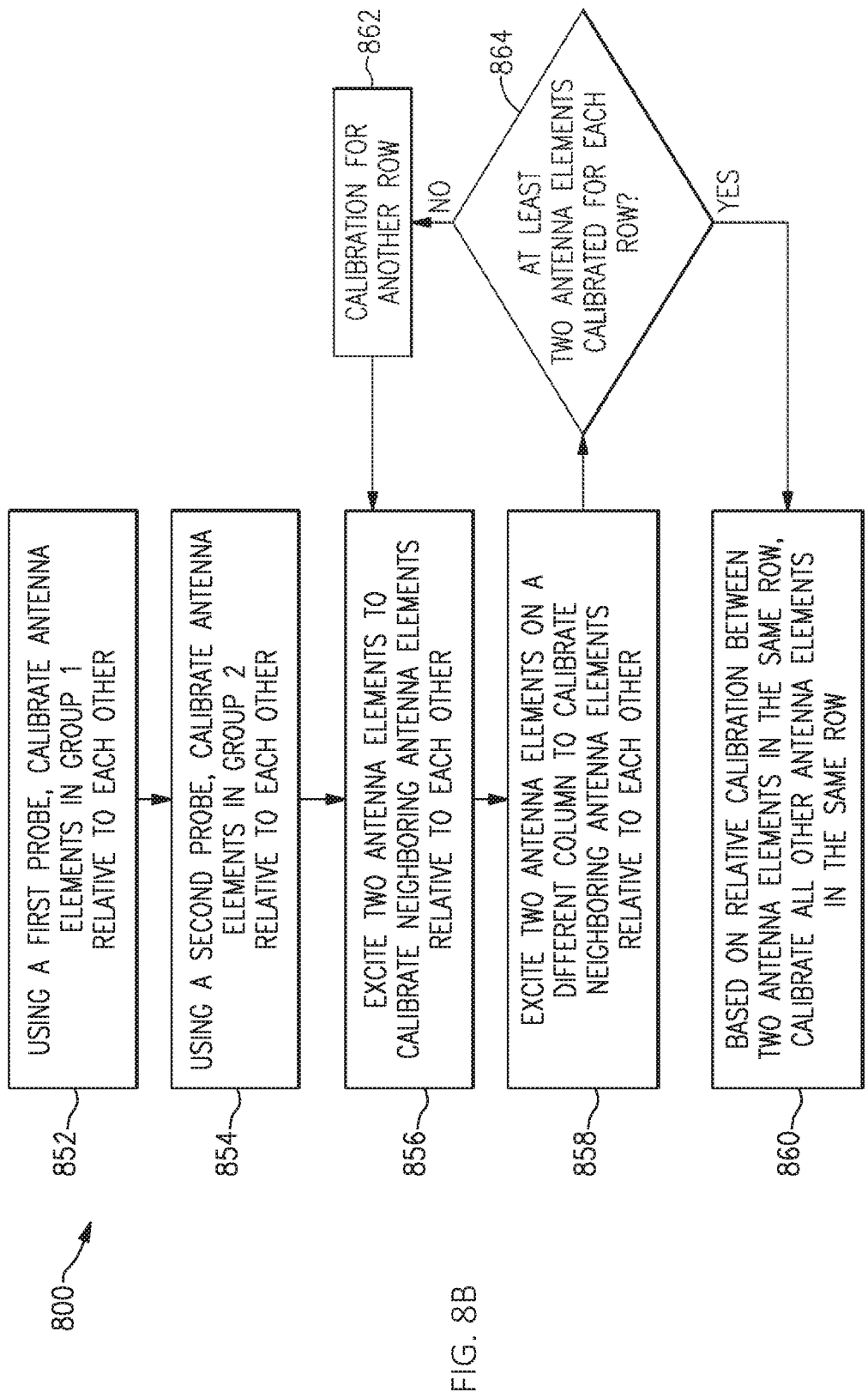
FIG. 8B illustrates a flow diagram for a process of calibration that can be applied to an 8×8 antenna array according to one embodiment of the present disclosure.

FIG. 8A illustrates an 8×8 antenna array with two probes according to an embodiment. FIG. 8B illustrates a flow diagram for a process of calibration that can be applied to an 8×8 antenna array according to an embodiment.

In the example of FIG. 8A, the 8×8 antenna array can include antenna elements across 8 rows and 8 columns. The illustrated antenna array includes antenna elements A11 to A88 and two probes. Accordingly, a chip that includes the array can have two probe input/outputs, one for each probe. Each of the antenna elements A11 to A88 includes a respective feeding point F11 to F88. The feeding points F11 to F88 can be disposed in different locations for certain antenna elements. For example, the feeding point F33 is located at a different point of antenna element A33 than where the feeding point F43 is located on antenna element A43. The antenna elements can be disposed substantially equidistant from neighboring antenna elements. For example, the antenna element A11 is equidistant to antenna elements AU and A21.

The antenna array of FIG. 8A includes two probes. The probes can be substantially equidistant from antenna elements. For example, probe 1 can be equidistant from antenna elements A44, A45, A54, and A55. Probe 2 can be equidistant from antenna elements A44, A34, A45, and A35. In the antenna array of FIG. 8A, probe 1 is located a first distance from feeding points of the nearest antenna elements and probe 2 is located a second distance from feedback points of the nearest antenna elements, in which the first distance is not equal to the second distance.

The process of FIG. 8B can calibrate transmit and/or receive paths of antenna elements of an antenna element array relative to each other using two probes. The process is an example method of implementing blocks 702 and 704 of the process of FIG. 7. The process of FIG. 8B can be applied to the 8×8 antenna array of FIG. 8A. At block 852, using a first probe, the antenna elements of group 1 can be calibrated relative to each other. For example, Group 1 can include antenna elements A44, A45, A54, and A55 of FIG. 8A. One or more signals can be transmitted from probe 1 and received by antenna elements A44, A45, A54, and A55. Based on the received signals at antenna elements A44, A45, A54, and A55, the receive paths for the antenna elements A44, A45, A54, and A55 can be calibrated relative to each other. In some embodiments, one or more signals can be transmitted from the antenna elements A44, A45, A54, and A55 and received by probe 1. Based on the received signals at probe 1, the transmit paths for the antenna elements A44, A45, A54, and A55 can be calibrated relative to each other.

At block 854, using a second probe, the antenna elements of group 2 can be calibrated relative to each other. For example, Group 2 can include antenna elements A44, A45, A34, and A35. One or more signals can be transmitted from probe 2 and received by antenna elements A44, A45, A34, and A35. Based on the received signals at antenna elements A44, A45, A34, and A35, the receive paths for the antenna elements antenna elements A44, A45, A34, and A35 can be calibrated relative to each other. In some embodiments, one or more signals can be transmitted from the antenna elements antenna elements A44, A45, A34, and A35 and received by probe 2. Based on the received signals at probe 2, the transmit paths for the antenna elements antenna elements A44, A45, A34, and A35 can be calibrated relative to each other. Accordingly, antenna elements are calibrated relative to each other in rows 3, 4, and 5 of the antenna array.

At block 856, two antenna elements can be excited simultaneously to calibrate neighboring antenna elements relative to each other. For example, antenna elements A44 and A54 can be excited simultaneously to provide signals to be received at antenna elements A34 and A64. Based on the received signals at antenna elements A34 and A64, the receive paths for the antenna elements antenna elements A34 and A64 can be calibrated relative to each other. In some embodiments, one or more signals can be transmitted from the antenna elements antenna elements A34 and A64 and received by antenna elements A44 and A54. Based on the received signals at A44 and A54, the transmit paths for the antenna elements antenna elements A34 and A64 can be calibrated relative to each other.

If a feeding point to the antenna elements of an array are not at the same position for antenna elements in each of the rows, then the simultaneous excitation can be helpful. For example, the feeding points (e.g., F11, F12, ..., F18) for the antenna elements of row 1 (e.g., A11, A12, ..., A18) are at the top of the antenna elements in the illustrated orientation. However, the feeding points (e.g., F21, F22, ..., F28) for the antenna elements of row 2 (e.g., A21, A22, ..., A18) are at the bottom in the illustrated orientation. Thus, the feeding points are not at the same positions for each row. However, if the antenna elements for A21 and A31 are excited simultaneously, the antenna elements A11 and A41 can receive a substantially similar signal. This is because antenna elements A11 and A21 are symmetrically disposed relative to A31 and A41. Thus, antenna elements A11 and A41 can be calibrated relative to each other.

At block 858, two antenna elements of a column can be excited simultaneously to calibrate neighboring antenna elements relative to each other. For example, antenna elements A45 and A55 can be excited simultaneously to be received at antenna elements A35 and A65. Based on the received signals at antenna elements A35 and A65, the receive paths for the antenna elements antenna elements A35 and A65 can be calibrated relative to each other. In some embodiments, one or more signals can be transmitted from the antenna elements antenna elements A35 and A65 and received by antenna elements A45 and A55. Based on the received signals at A45 and A55, the transmit paths for the antenna elements antenna elements A35 and A65 can be calibrated relative to each other.

At block 864, if there are at least two antenna elements calibrated for each row, then the flow diagram proceeds to block 860. Otherwise, calibration is performed for another row at block 862. For example, blocks 856 and 858 can be repeated to calibrate antenna elements A[row number]4 and A[row number]5 in rows 2 and 5 relative to each other, antenna elements in rows 1 and 4 relative to each other, antenna elements in rows 7 and 4 relative to each other, and antenna elements in rows 8 and 5 relative to each other. Accordingly, antenna elements are calibrated relative to each other for each of the rows.

At block 860, based on relative calibration between two antenna elements in the same row, antenna elements in the same row are calibrated relative to each other. For example, for row 5, antenna elements A54 and A55 are calibrated relative to each other. Antenna element A54 can transmit one or more signals to be received by antenna elements A55 and A53. Based on the received signals, the receive paths for antenna elements A55 and A53 can be calibrated relative to each other. In some embodiments, the antenna elements A55 and A53 transmit one or more signals to be received by antenna element A54. Based on the received signal, the transmit paths of the antenna elements A55 and A53 can be calibrated relative to each other.

This process can be repeated for the other antenna elements in the row. For example, pairs of antenna elements (e.g., A52 and A54, A53 and A51, A54 and A56, A55 and A57, and A56 and A58) can be calibrated relative to each other. The relative calibration can be performed for each row. Accordingly, the antenna elements of an array (such as an 8×8 array) can be calibrated relative to each other.

Advantageously, with 2 probes, the antenna elements of the antenna array of FIG. 8A can be calibrated relative to each other. Furthermore, antenna elements can be calibrated relative to each other with 2 probes for arrays with similar feeding point and antenna element arrangements as shown in FIG. 8A regardless of the size of the array using the method described in FIG. 8B. In traditional systems, without implementing the antenna element to antenna element calibration, a probe may be disposed equidistant among antenna elements. For example, a probe may be disposed equidistant among four antenna elements (e.g., probe 1 between A44, A45, A34, and A35). Accordingly, if an antenna array includes N×M antenna elements, the system may include (N−1)*(M−1) probes. In other systems, a probe may be placed between two antenna elements (e.g., a probe between A11 and A21, another probe between A21 and A31). In this circumstance, the system may include [(N)*(M−1)]+[(N−1)*(M)] probes. Systems and methods of antenna array calibration discussed herein can reduce the amount of probes for performing relative calibration relative to previous calibration methods. Moreover, such systems and methods can also reduce the number of probe input/outputs of an antenna array chip. For instance, antenna array chips discussed herein have fewer than (N−1)*(M−1) probes and corresponding probe input/outputs. More specifically, antenna array chips discussed with reference to FIGS. 8A to 17 include one probe with one probe input/output or two probes with two probe input/outputs.

Antenna Element Relative Calibration for Antenna Array Using One Probe

Figure 9:
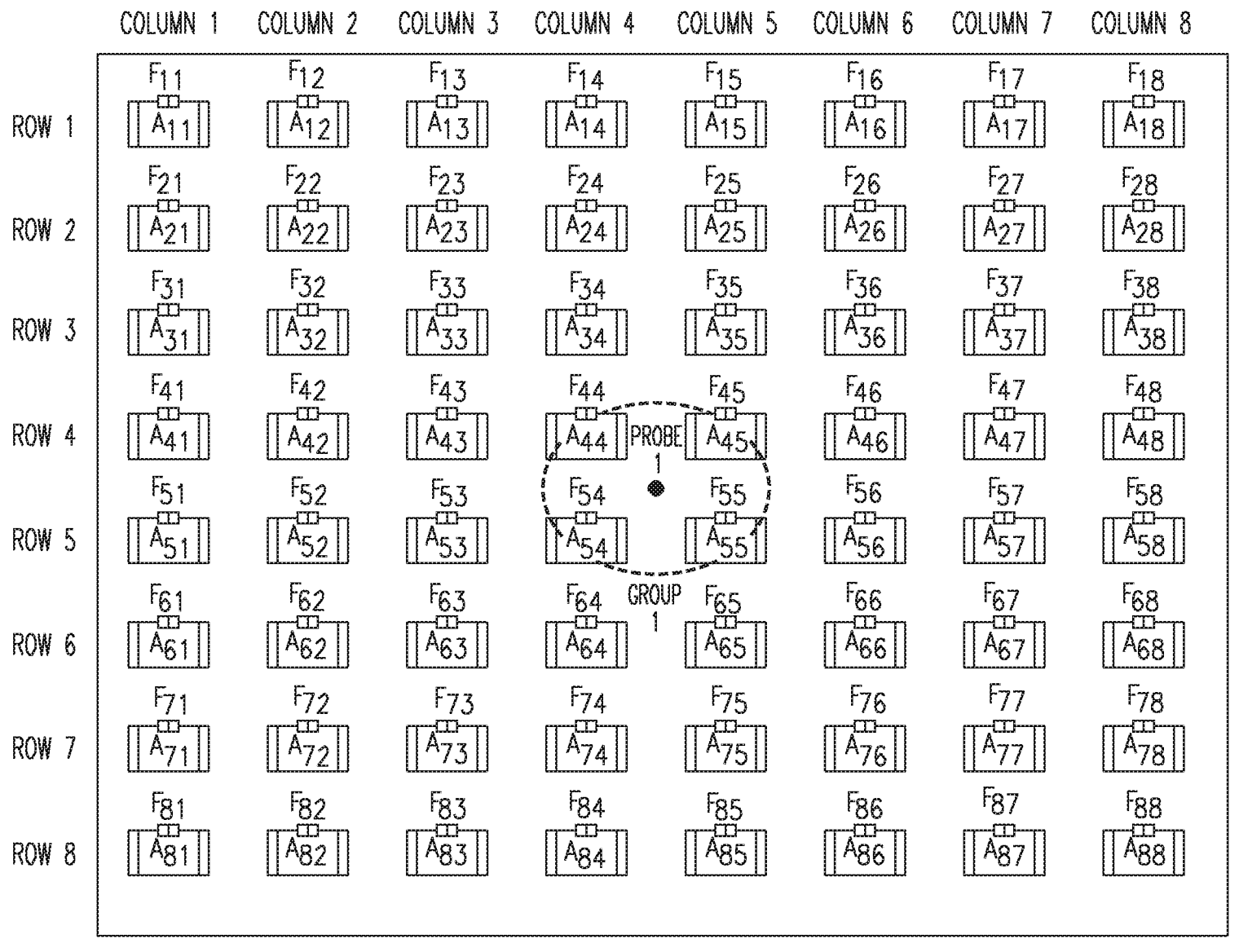

FIG. 9 illustrates an 8×8 antenna array with one probe according to an embodiment. In some embodiments, the feed point (e.g., F11) for the antenna elements (e.g., A11) can be placed at the same position for each antenna element of the array. For example, the feed points can all be placed at the top of the antenna elements in the orientation illustrated in FIG. 9. In this scenario, relative calibration can be performed using a single probe. Accordingly, a chip that includes the array can have one probe input/output.

For example, as described above for block 852, a first probe can be used to calibrate antenna elements in group 1. Accordingly, antenna elements for each of rows 4 and 5 can be calibrated relative to each other. Furthermore, antenna elements for each of columns 4 and 5 can be calibrated relative to each other.

For example, as described above for block 860, two antenna elements in a single row that are calibrated relative to each other can be used to calibrate all antenna elements in that same row. Similar to the concepts described for block 860, two antenna elements in a single column that are calibrated relative to each other can be used to calibrate all antenna elements in that same column. Advantageously, the 8×8 antenna elements shown in FIG. 9 can be calibrated relative to each other using a single probe because the feed points for the antenna elements are symmetrical across rows and columns.

Probe to Antenna Element Relative Calibration

Figure 10:
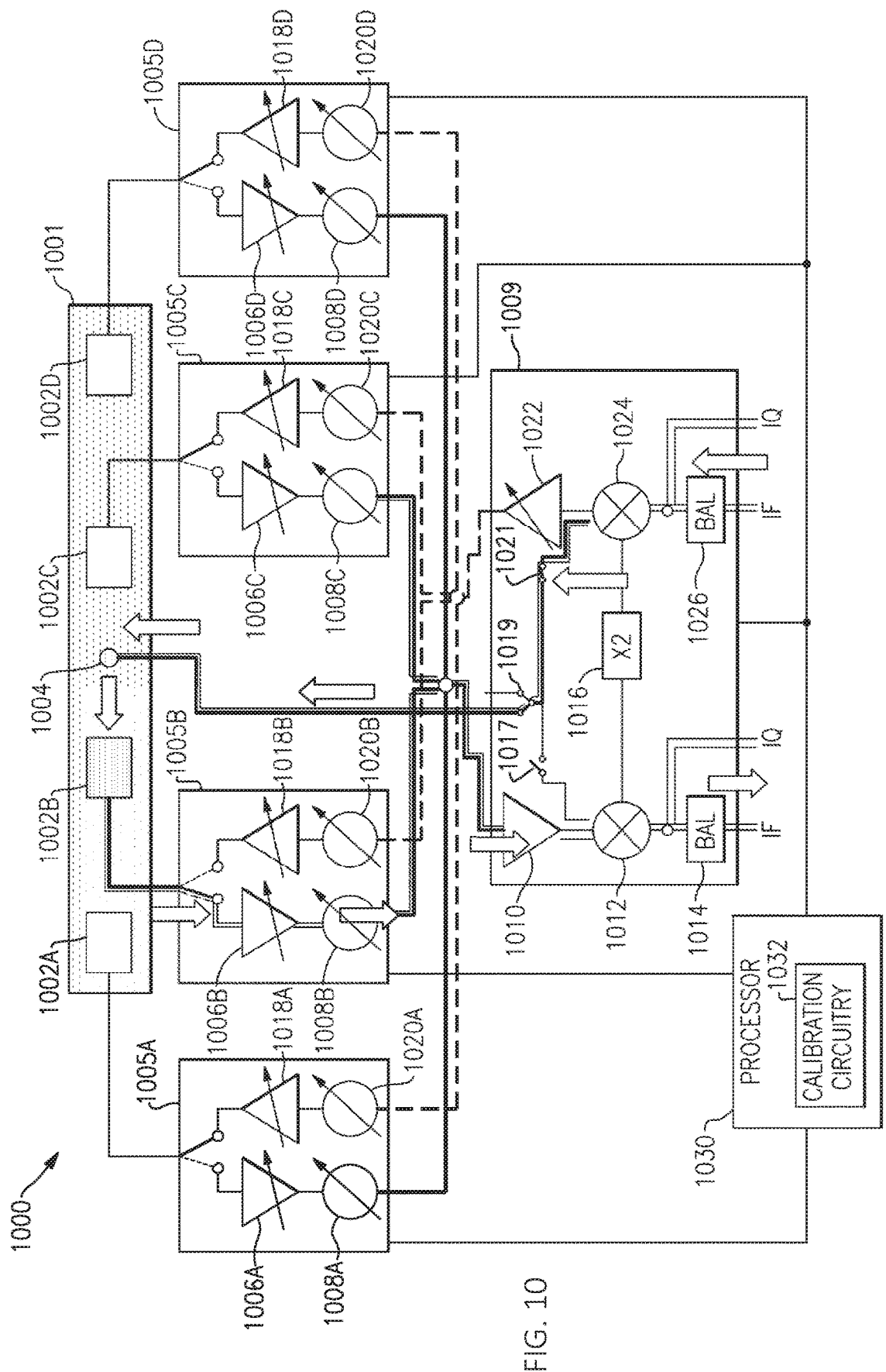
FIG. 10 illustrates signal flow for probe to antenna element calibration for a receive path in an antenna system according to one embodiment of the present disclosure.
Figure 11:
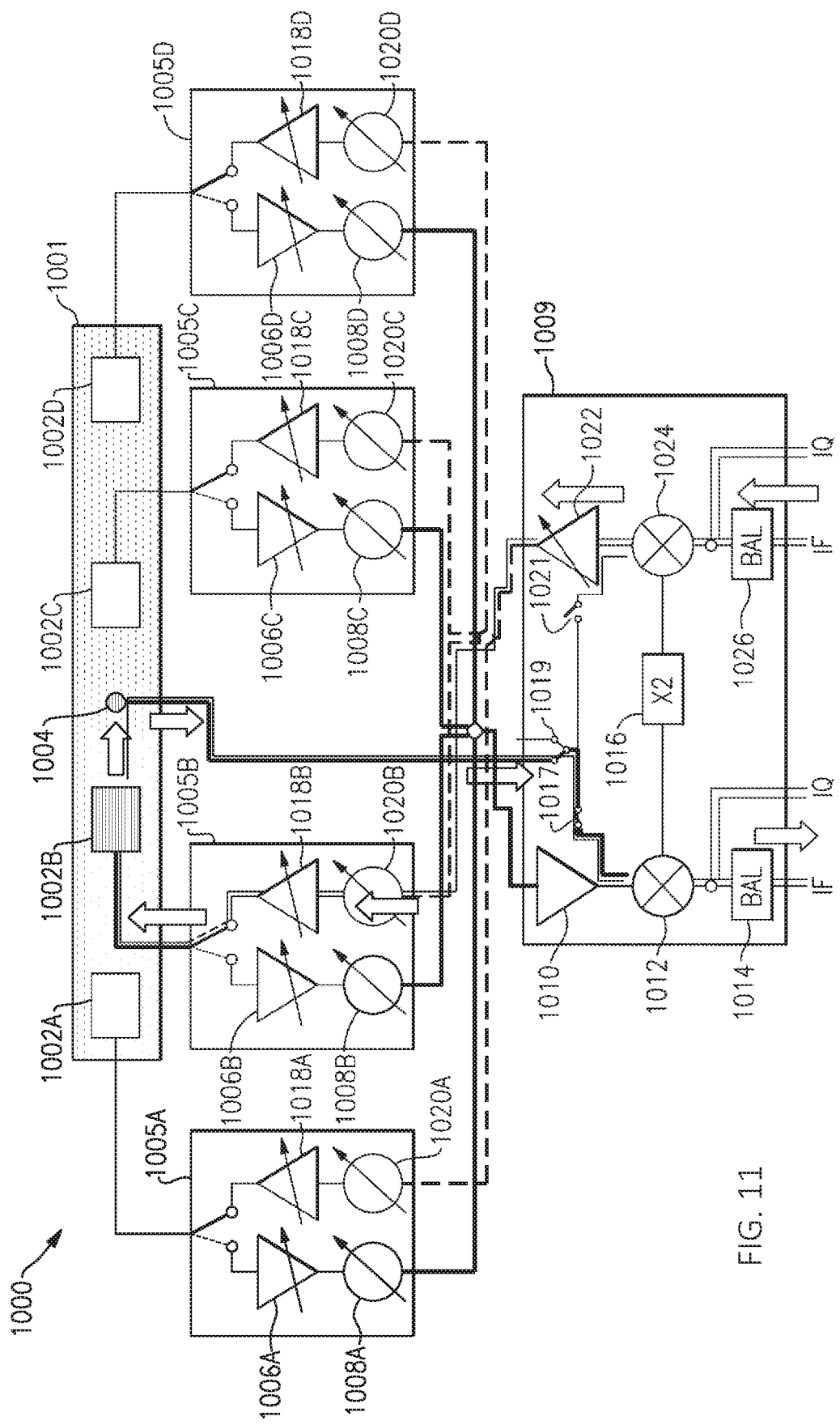
FIG. 11 illustrates signal flow an antenna element to antenna element calibration for a transmit path in an antenna system according to one embodiment of the present disclosure.

FIG. 10 illustrates signal flow for probe to antenna element calibration for a receive path in an antenna system 1000 according to an embodiment. FIG. 11 illustrates signal flow for probe to antenna element calibration for the transmit path in an antenna system 1000 according to an embodiment. These figures can illustrate the same antenna system 1000 in different states for calibrating different paths. FIGS. 10 and 11 illustrate example systems and signal flows that can correspond to operation 702 of the process 700, operation 852 of the process 800, or operation 854 of the process 800. The illustrated antenna system 1000 includes an antenna array chip 1001, beamformers 1005A to 1005D, upconverter and downconverter circuitry 1009, and a processor 1030. The processor 1030 the calibration circuitry 1032 can be included in any other antenna systems discussed herein, such as the antenna systems shown in FIGS. 11, 12, 13, 16, and 17.

In FIG. 10, the antenna array chip 1001 includes four antenna elements 1002A, 1002B, 1002C, and 1002D (collectively referred to as antenna elements 1002). The illustrated antenna array chip 1001 can also include a probe 1004. The probe 1004 can be disposed within the array of the antenna elements 1002. In alternative embodiments, the probe 1004 can be disposed outside of the array of the antenna elements 1002. Moreover, antenna array chip 1001 can include two probes, for example, in accordance with the principles and advantages discussed with reference to FIGS. 8A and/or 8B.

As illustrated, the processor 1030 includes calibration circuitry 1032. The calibration circuitry 1032 can provide signals to the beamformers 1005A, 1005B, 1005C, and 1005D (collectively referred to herein as beamformers 1005) to calibrate the phase and amplitude for receive and transmit paths. The receive paths of the beamformers 1005 can include a programmable gain amplifier 1006A, 1006B, 1006C, and 1006D (collectively referred to as receive path programmable gain amplifiers 1006) and/or a phase shifters 1008A, 1008B, 1008C, and 1008D (collectively referred to as receive path phase shifters 1008). The beamformers 1005 can include a programmable gain amplifier 1018A, 1018B, 1018C, and 1018D (collectively referred to as transmit path adjustable gain amplifiers 1018) and/or a phase shifters 1020A, 1020B, 1020C, and 1020D (collectively referred to as transmit path phase shifters 1020).

The downconverter circuitry can include an amplifier 1010, a mixer 1012, and/or a balancer 1014. The upconverter circuitry can include an amplifier 1022, a mixer 1024, and/or a balancer 1026. The balancer 1014 and/or the balancer 1026 can mitigate imbalances in the in-phase and quadrature (IQ) signals due to mismatching.

The probe 1004 can be connected to the upconverter circuitry and/or the downconverter circuitry. The probe 1004 can be connected to the upconverter circuitry and the downconverter circuitry using one or more switches 1017, 1019, 1021. The switch 1019 can selectively electrically connect a probe (such as the probe 1004 or a second probe of the antenna array chip 1001) to a path to a mixer of the upconverter/downconverter circuitry 1009. A first switch 1017 and the second switch 1019 can be used to provide a signal received by the probe 1004 to the mixer 1012 of the downconverter circuitry in the state corresponding to FIG.

The third switch 1021 can be open to prevent the signal received by the probe 1004 from propagating to the transmit path. Advantageously, the probe 1004 can be implemented for relative calibration with reduced wiring between the probe and the upconverter/downconverter circuitry and reduced number of input and output ports.

As illustrated in FIG. 10, a signal can be upconverted by the mixer 1024. The signal can be coupled from an output of the mixer 1024, and provided to the probe 1004 via the switches 1021 and 1019, and transmitted from the probe 1004 in the state corresponding to FIG. 10. The probe 1004 can radiate the signal and the antenna element 1002B can receive the radiated signal. The signal received by the antenna element 1002B can propagate through the beamformer 1005B, such as the programmable gain amplifier 1006B and the phase shifter 1008B, and propagates through the amplifier 1010 and the mixer 1012 that downconverters the signal to the balancer 1014. The mixer 1012 can output IF and/or IQ signals.

A receiver can measure the amplitude and/or phase of the signal that propagated through this entire path (e.g., including from the mixer 1024 of the upconverter to the mixer 1012 of the downconverter).

A signal can be transmitted from the probe 1004 and received by the antenna element 1002C. The received signal can propagate through the programmable gain amplifier 1006C, the phase shifter 1008C, the amplifier 1010, the mixer 1012, and the balancer 1014. The power and/or phase can then be measured.

For example, the receiver can measure the amplitude and/or phase of the signal through this path. Based on the measured signals from the two paths, the one or more of the beamformers 1005 can be adjusted such that the receive paths for the two antenna elements 1002B and 1002C are calibrated relative to each other.

As illustrated in FIG. 11, a signal can be transmitted and upconverted by the mixer 1024. The signal can be phase shifted by the phase shifter 1020B, amplified by the programmable gain amplifier 1018B, and radiated from the antenna element 1002B. The probe 1004 can receive the signal. The switches 1019 and 1021 can enable the signal received by the probe 1004 to propagate to the receiver via the coupler. The switch 1017 can be open to prevent the signal from propagating to the transmit path. The receiver can measure the amplitude and/or phase of the signal that propagated through this entire path.

Another signal can be transmitted from the antenna element 1002C and received by the probe 1004. The receiver can measure the amplitude and/or phase of the signal through this path. Based on the measured signals from the two paths, one or more of the beamformers 1005 can be adjusted such that the transmit path for the two antenna elements 1002B and 1002C are calibrated relative to each other.

In some embodiments, one or more components of FIG. 10 can be included in a base station and/or a mobile device. In some embodiments, the calibration components can be integrated into the circuitry of the antenna array and/or the chip of the upconverter/downconverter.

Antenna Element to Antenna Element Relative Calibration

Figure 12:
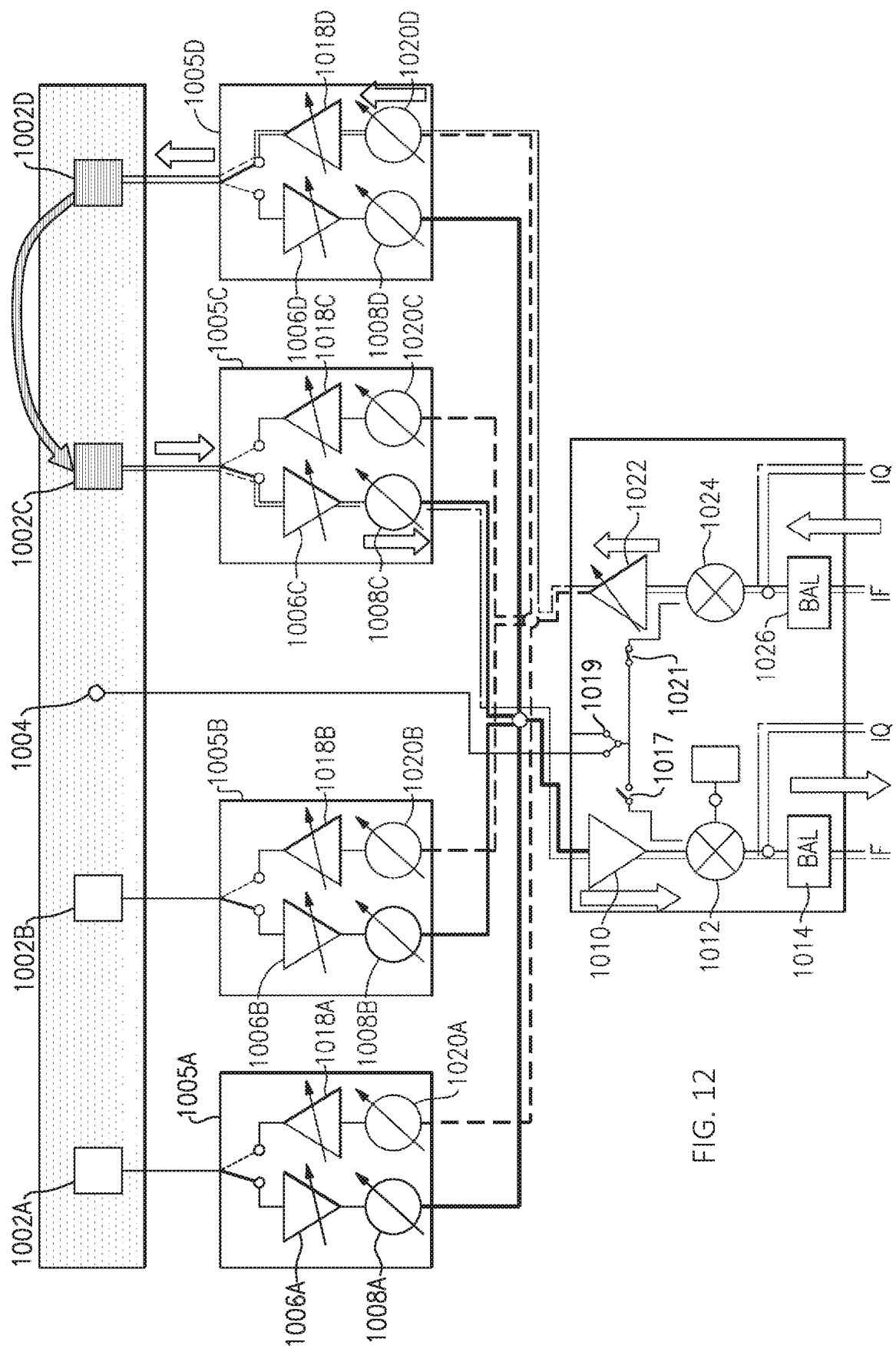
FIG. 12 illustrates signal flow for an antenna element to antenna element calibration for a transmit path in an antenna system according to one embodiment of the present disclosure.
Figure 13:
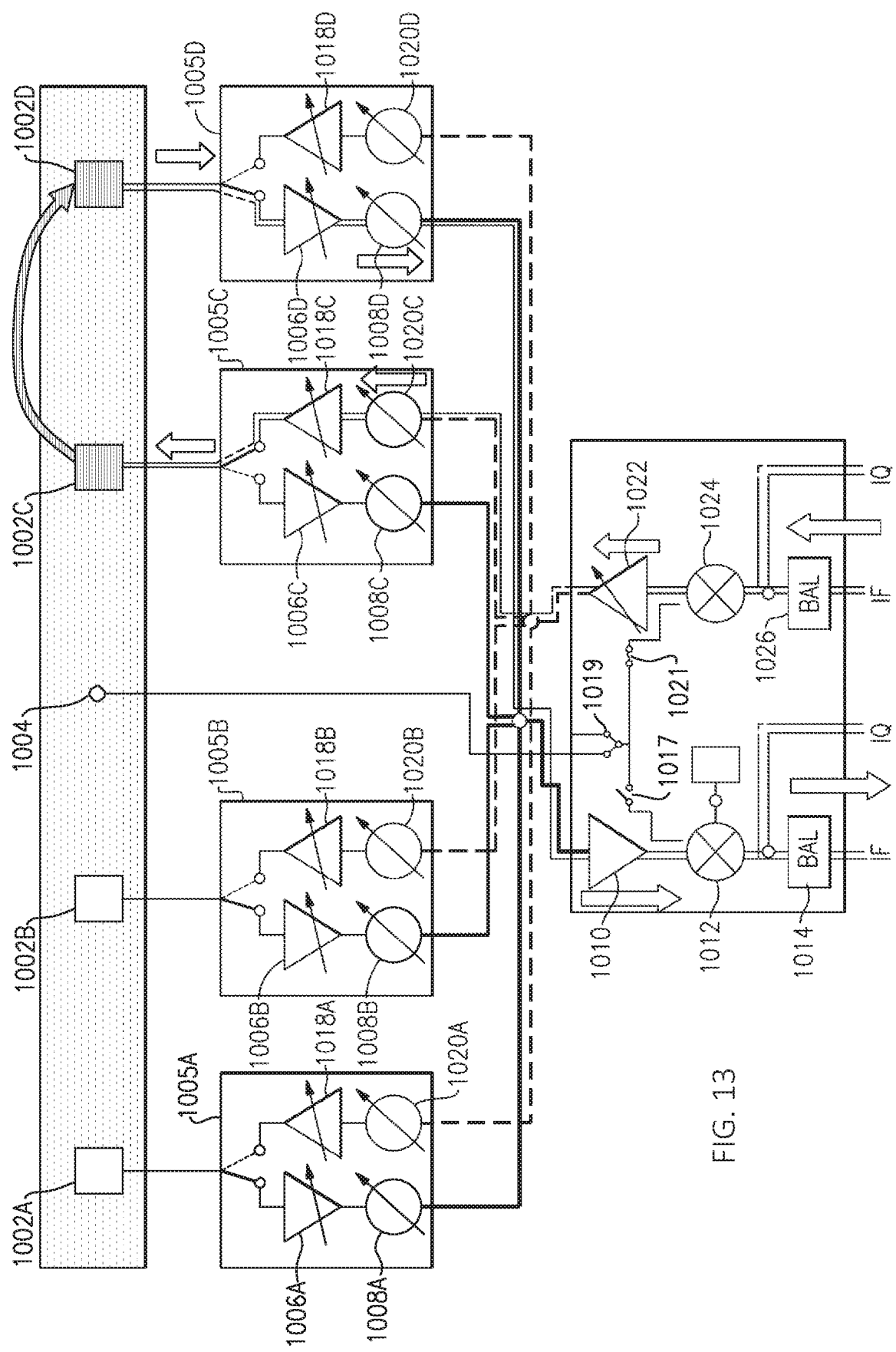
FIG. 13 illustrates signal flow for an antenna element to antenna element calibration for a receive path in an antenna system according to one embodiment of the present disclosure.

In some embodiments, two antenna elements that are calibrated relative to one another can be used to calibrate another antenna element. FIG. 12 illustrates signal flow for an antenna element to antenna element calibration for the transmit path in an antenna system 1000 according to an embodiment. FIG. 13 illustrates signal flow for an antenna element to antenna element calibration for the receive path in an antenna system 1000 according to an embodiment. These figures illustrate the same antenna system 1000 in different states for calibrating different paths. FIGS. 12 and 13 illustrate example systems and signal flows that can correspond to operation 704 of the process 700 and/or operations 856, 858, and 860 of the process 800.

In some embodiments, antenna elements can be disposed substantially equidistant to each other. In FIG. 12, a signal can be transmitted from antenna element 1002D and received by antenna element 1002C. A signal can be transmitted from antenna element 1002B and received by antenna element 1002C. Based on the signal received at the antenna element 1002C from the antenna elements 1002B and 1002D, the receive paths for the antenna elements 1002B and 1002D can be calibrated relative to each other.

In FIG. 13, a signal can be transmitted from antenna element 1002C and received by antenna element 1002D. A signal can be transmitted from antenna element 1002C and received by antenna element 1002D. Based on the signal received at the antenna elements 1002B and 1002D from the antenna element 1002C, the transmit paths for the antenna elements 1002B and 1002D can be calibrated relative to each other.

Figure 14:
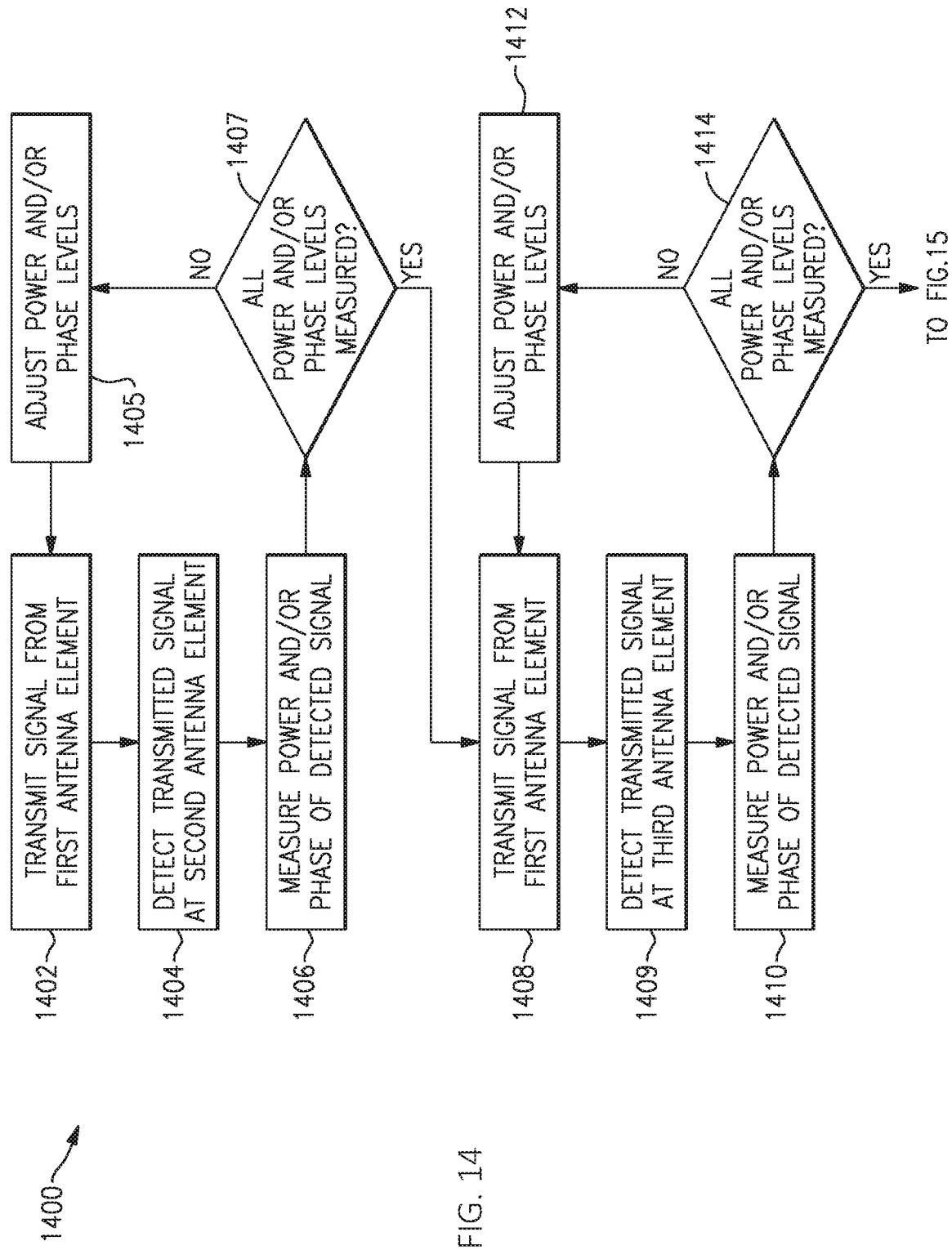
FIG. 14 illustrates a flow diagram for a process of an antenna element to antenna element calibration for the receive path according to one embodiment of the present disclosure.

FIG. 14 illustrates a flow diagram for a process 1400 of an antenna element to antenna element calibration for the receive path according to an embodiment. The process 1400 can correspond to the operation 704 in the process 700. At block 1402 of FIG. 14, a signal can be transmitted from a first antenna element and at block 1404 the signal can be received at a second antenna element. At block 1406, the received signal can measure the power and/or phase of the detected signal. At block 1407, if all power and/or phase levels are measured, the process 1400 can proceed to block 1408. Otherwise, the phase and/or power levels can be adjusted at block 1404. At block 1408, a signal can be transmitted from a first antenna element and at block 1405 a transmitted signal can be detected at a third antenna element. At block 1414, if all power and/or phase levels are measured, the process 1400 can proceed to block 1408. Otherwise, the phase and/or power levels can be adjusted at block 1412. In some embodiments, transmitting a signal from the first antenna element at block 1402 and/or 1408 can include exciting two antenna elements (e.g., the first antenna element and a fourth antenna element) to calibrate neighboring antenna elements (e.g., the second antenna element and the third antenna element) relative to each other, such as the operation 856 described in process 800.

Figure 15:
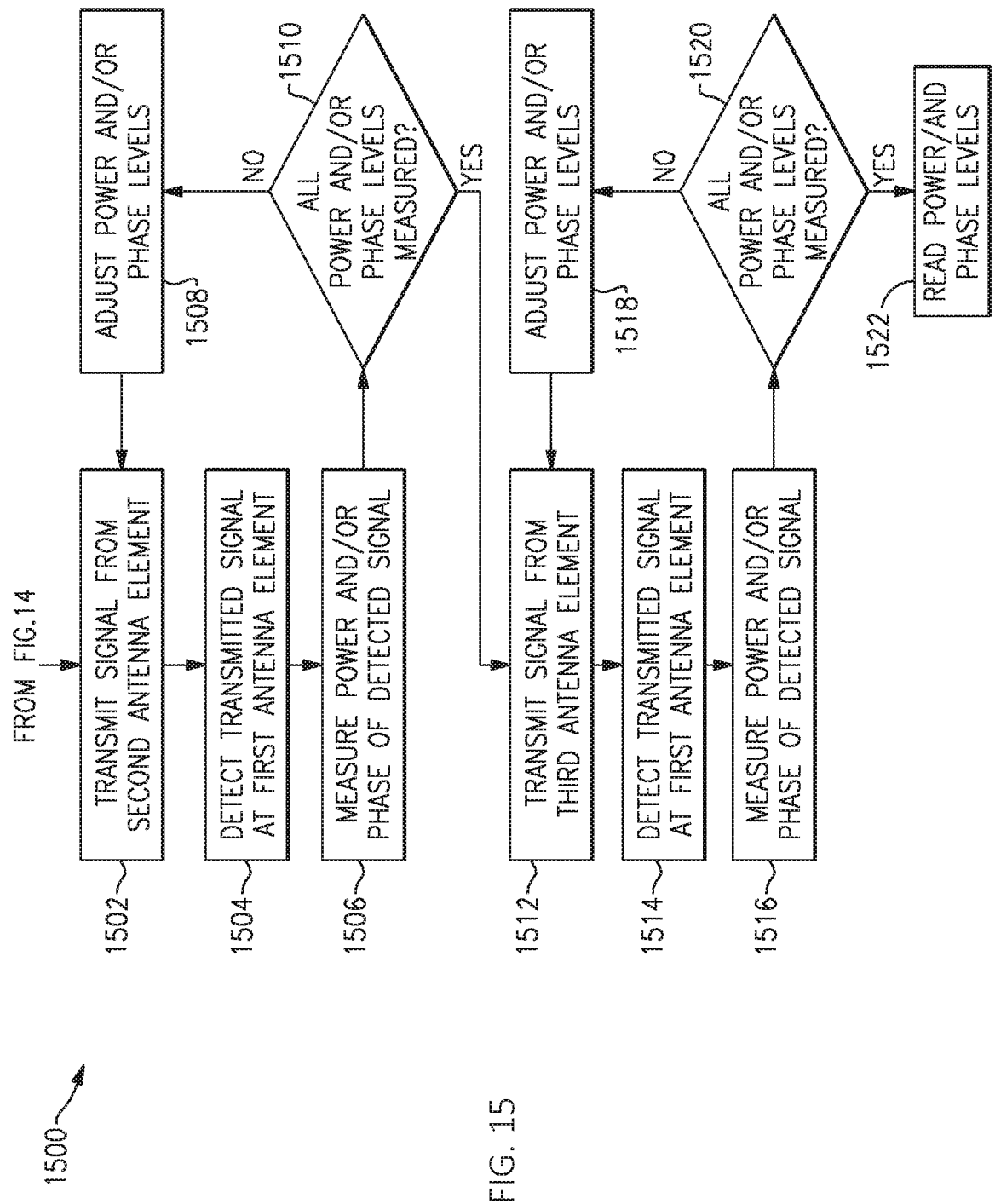
FIG. 15 illustrates a flow diagram for a process of an antenna element to antenna element calibration for the transmit path according to one embodiment of the present disclosure.

FIG. 15 illustrates a flow diagram for a process 1500 of an antenna element to antenna element calibration for the transmit path according to an embodiment. The process 1500 can correspond to the operation 704 in the process 700. In FIG. 15, at block 1502, a signal can be transmitted from a second antenna element and at block 1504 received by a first antenna element. At block 1506, the receiver can measure the power and/or phase of the detected signal. If all power and/or phase levels are measured at block 1506, the flow diagram can proceed to block 1512. Otherwise, the beamformer components can be adjusted at block 1508.

At block 1512, a signal can be transmitted from a third antenna element and at block 1514 a first antenna element can receive the transmitted signal. At block 1516, the receiver can measure the power and/or phase of the detected signal. At block 1520, if all power and/or phase levels are measured, the flow diagram can proceed to block 1522. Otherwise, the power and/or phase levels can be adjusted at block 1518.

Antenna Array to Antenna Array Relative Calibration

In some embodiments, a first and second antenna elements on a first antenna array that are calibrated relative to one another can be used to calibrate a third antenna element on a second antenna array. In some embodiments, a first antenna element is substantially equidistant to the second and third antenna element.

Figure 16:
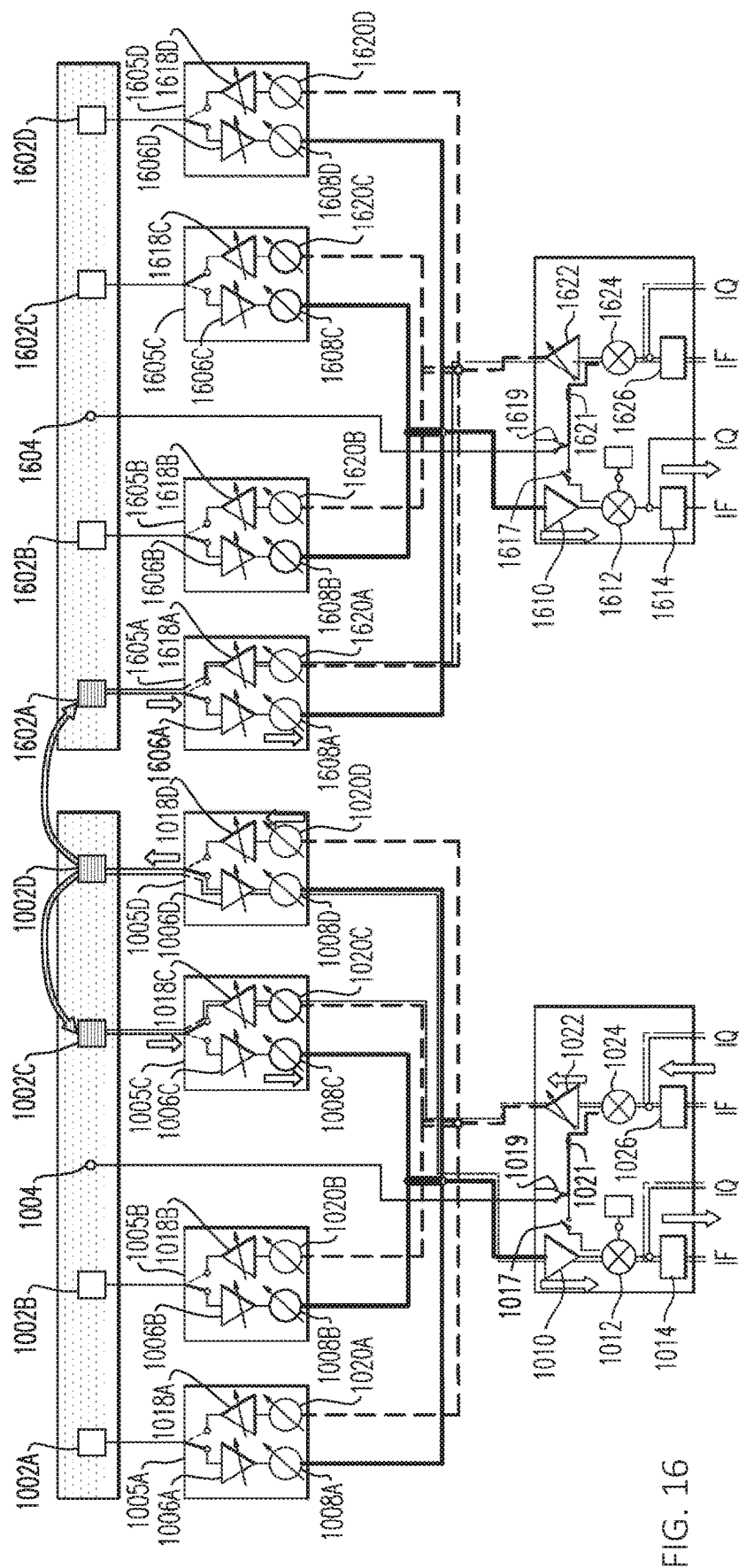
FIG. 16 illustrates signal flow for an antenna array to antenna array calibration for receive paths in an antenna system according to one embodiment of the present disclosure.

FIG. 16 illustrates signal flow for an antenna array to antenna array calibration for receive paths in an antenna system according to an embodiment. FIG. 16 illustrates an example system and signal flow that can correspond to operation 706 of the process 700. The illustrated antenna system includes a first antenna array chip, first beamformers 1005A, 1005B, 1005C, 1005D, switches 1017, 1019, and 1021 to control the signal path to and/or from the probe 1004, first upconverter and downconverter circuitry. The first antenna array chip can include antenna elements 1002A, 1002B, 1002C, and 1002D and a probe 1004. The first beamformers 1005A, 1005B, 1005C, 1005D can each include a respective programmable gain amplifier 1006A, 1006B, 1006C, and 1006D for the receive path, a phase shifter 1008A, 1008B, 1008C, and 1008D for the receive path, a programmable gain amplifier 1018A, 1018B, 1018C, 1018D for the transmit path, and/or a phase shifter 1020A, 1020B, 1020C, and 1020D for the transmit path. The upconverter circuitry can include a mixer 1024, a balancer 1026, and an amplifier 1022. The downconverter circuitry can include an amplifier 1010, a mixer 1012, and a balancer 1014.

The illustrated antenna system also includes a second antenna array chip, second beamformers 1605A, 1605B, 1605C, 1605D, switches 1617, 1619, and 1621 to control the signal path to and/or from the probe 1604, second upconverter circuitry and downconverter circuitry. The second antenna array chip can include antenna elements 1602A, 1602B, 1602C, and 1602D and a probe 1604. The second beamformers 1605A, 1605B, 1605C, 1605D can each include a respective programmable gain amplifier 1606A, 1606B, 1606C, and 1606D for the receive path, a phase shifter 1608A, 1608B, 1608C, and 1608D for the receive path, a programmable gain amplifier 1618A, 1618B, 1618C, 1618D for the transmit path, and/or a phase shifter 1620A, 1620B, 1620C, and 1620D for the transmit path. The second upconverter circuitry can include a mixer 1624, a balancer 1626, and an amplifier 1622. The second downconverter circuitry can include an amplifier 1610, a mixer 1612, and a balancer 1614.

A signal can be transmitted from a first antenna element 1002D of a first antenna array and received at a second antenna element 1002C of the first antenna array. Another signal can be transmitted from the first antenna element 1002D and received at a third antenna element 1602A of a second antenna array. Because the first antenna element is substantially equidistant to the second and third antenna elements, the receive paths for the second antenna element 1002C of the first antenna array and the third antenna element 1602A of the second array can be calibrated relative to each other.

Figure 17:
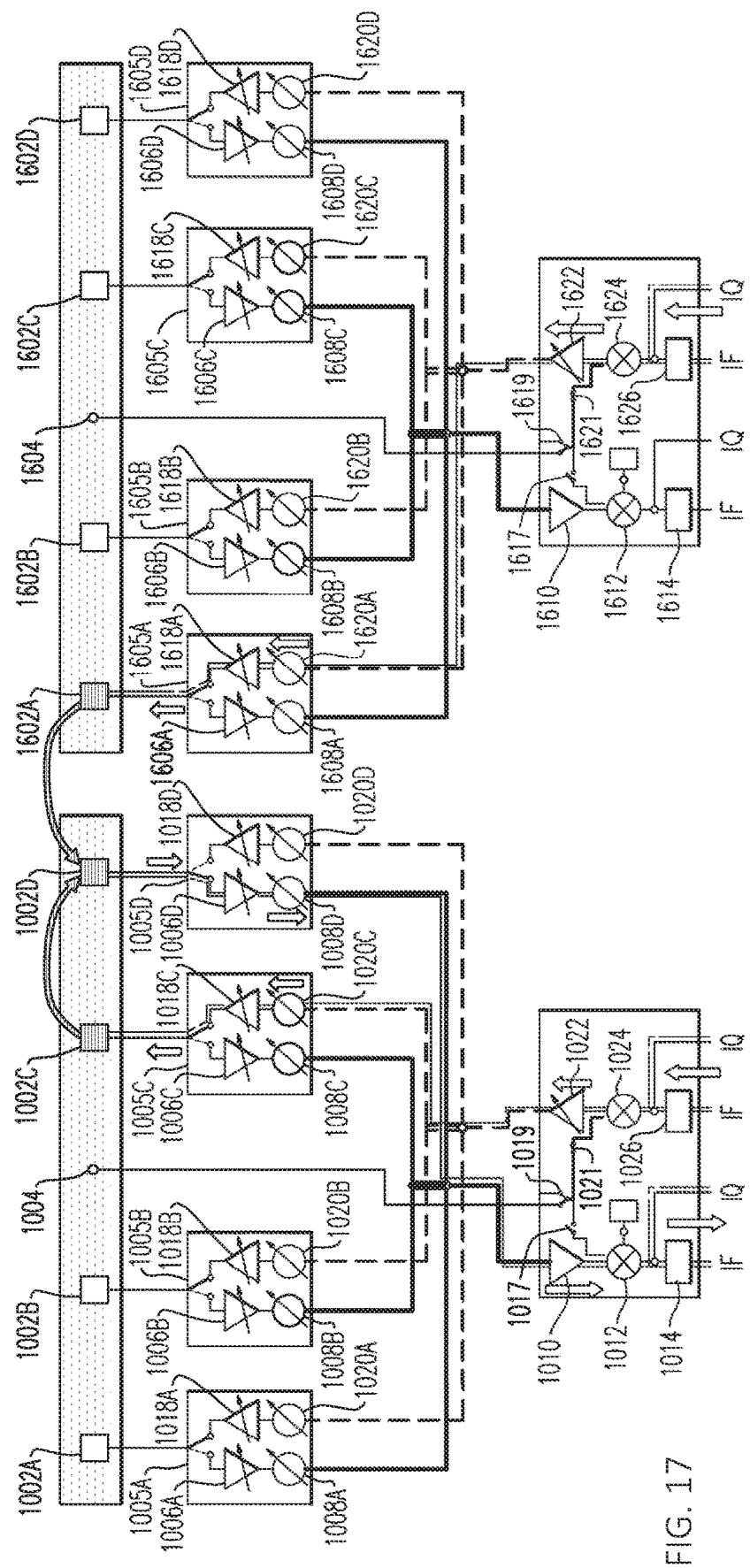
FIG. 17 illustrates signal flow for an antenna array to antenna array calibration for transmit paths in an antenna system according to one embodiment of the present disclosure.

FIG. 17 illustrates signal flow for an antenna array to antenna array calibration for transmit paths in an antenna system according to an embodiment. FIGS. 16 and 17 correspond to the same antenna system in different states FIG. 17 illustrates an example system and signal flow that can correspond to operation 708 of the process 700. A signal can be transmitted from a second antenna element 1002C of a first antenna array and received at a first antenna element 1002D of the first antenna array. Another signal can be transmitted from the third antenna element 1602A and received at the first antenna element 1002D of a first antenna array. Because the first antenna element is substantially equidistant to the second and third antenna elements, the transmit paths for the second antenna element 1002C of the first antenna array and the third antenna element 1602A of the second array can be calibrated relative to each other.

Accordingly, the transmit paths and/or receive paths corresponding to antenna elements of different antenna array chips can be calibrated relative to each other. This can enable calibration of antenna systems that include multiple antenna element arrays.

Antenna Apparatus with a Switching Circuit

Figure 18A:
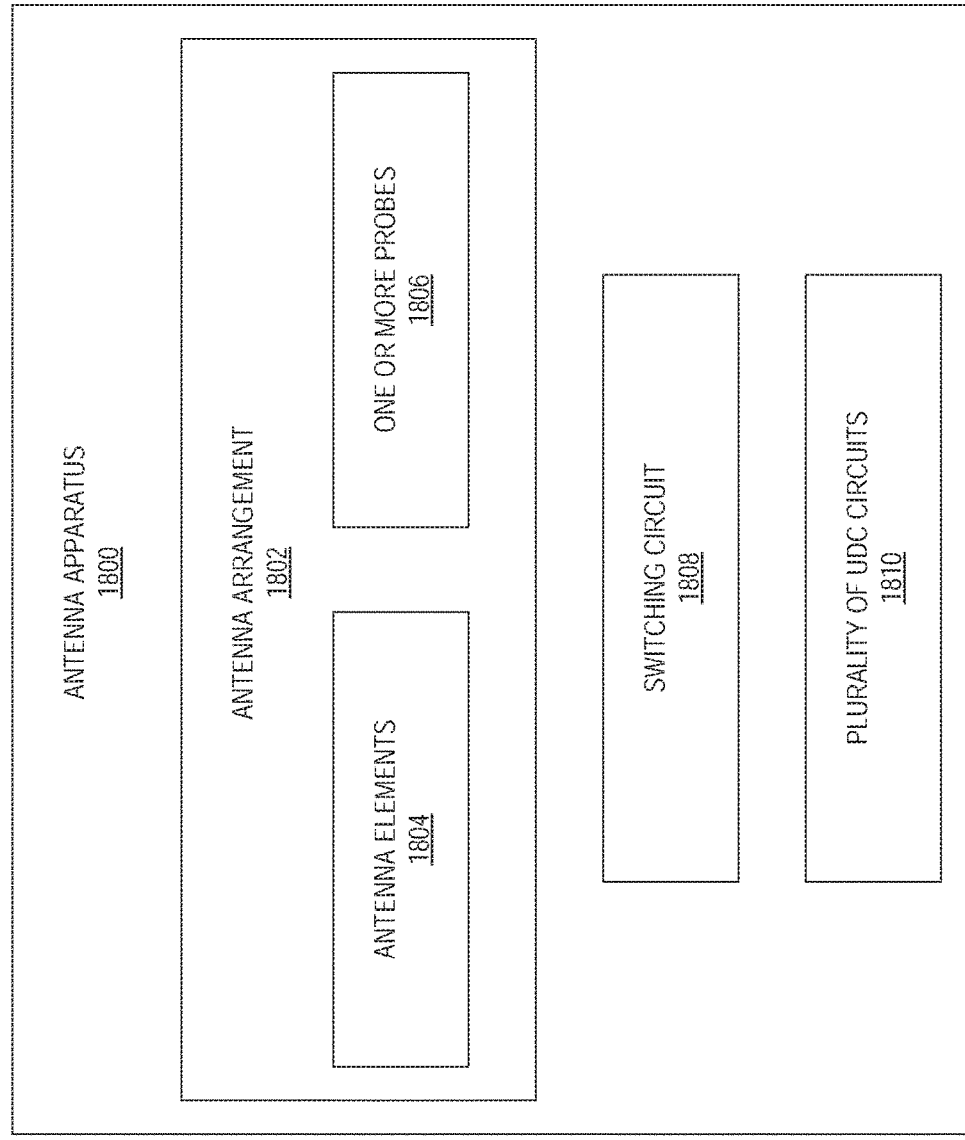
FIG. 18A is a block diagram of an antenna apparatus, according to one embodiment of the present disclosure.

FIG. 18A provides a block diagram of an antenna apparatus 1800, according to one embodiment of the present disclosure. As shown in FIG. 18A, the antenna apparatus 1800 may include an antenna arrangement 1802 that includes a plurality of antenna elements 1804 forming an antenna array, and one or more probes 1806. The antenna apparatus 1800 may further include a switching circuit 1808 and one or more, typically a plurality of, UDC circuits 1810.

Any of the plurality of antenna elements 1804 may include any of the antenna elements described above, e.g., any of the antenna elements 102. Any of the one or more probes 1806 may include any of the probes described above, e.g., any of the probe 1, probe 2, or probe 1004. Any of the UDC circuits 1810 may include any of the UDC circuit elements described above, e.g., any of the upconverter and downconverter circuitry 1009 (including only the upconverter part of the upconverter and downconverter circuitry 1009, or only the downconverter part of the upconverter and downconverter circuitry 1009). The switching circuit 1808 may include any combination of the switches described above, e.g., any of the switches 1017, 1019, 1021, 242, or 248, configured to selectively connect and disconnect any one of the UDC circuits 1810 to any one of the antenna elements 1804 and the one or more probes 1806.

The switching functionality of the antenna apparatus is based on recognition that, by implementing the switching circuit 1808, at least some of the UDC circuits 1810 may be used for two purposes, with each purpose being associated with a respective different mode of operation. The first purpose is for a UDC circuit to perform its conventional functions of upconverting signals to generate RF signals for transmission by the antenna elements 1804 and/or downconverting RF signals received by the antenna elements 1804 (i.e., in the first mode, the UDC circuit performs upconversion and/or downconversion of signals to enable "normal" operation of the antenna elements 1804). The second purpose is for a UDC circuit to assist calibration of the antenna elements 1804 by performing functions of upconverting and/or downconverting signals, but now for one (or more) of the probes 1806 (i.e., in the second mode, the UDC circuit performs upconversion and/or downconversion of signals to enable calibration). Namely, the switching circuit 1808 is implemented so that, at some times, a given UDC circuit 1810 may perform its conventional functions of upconverting and/or downconverting signals for one (or more) of the antenna elements 1804 (i.e., "normal" operation of the first mode), while, at other times, the same UDC circuit 1810 may perform analogous functions but for one (or more) of the probes 1806 (i.e., calibration of the second mode). To that end, for "normal" operation, the switching circuit 1808 is configured to disconnect the UDC circuit 1810 from all of the probes 1806 and connect the UDC circuit to one (or more) of the antenna elements 1804 for which the UDC circuit 1810 is configured to upconvert and/or downconvert signals for (i.e., the UDC circuit may then be described as operating in a "no-probe" mode because it is not connected to any probes). On the other hand, for calibration, the switching circuit 1808 is configured to disconnect the UDC circuit 1810 from all of the antenna elements 1804 and connect the UDC circuit to one (or more) of the probes 1806 for which the UDC circuit 1810 is configured to upconvert and/or downconvert signals for (i.e., the UDC circuit may then be described as operating in a "calibration" mode because providing RF signals to and/or receiving RF signals from a probe enables calibration, e.g., according to techniques described herein).

Figure 18B:
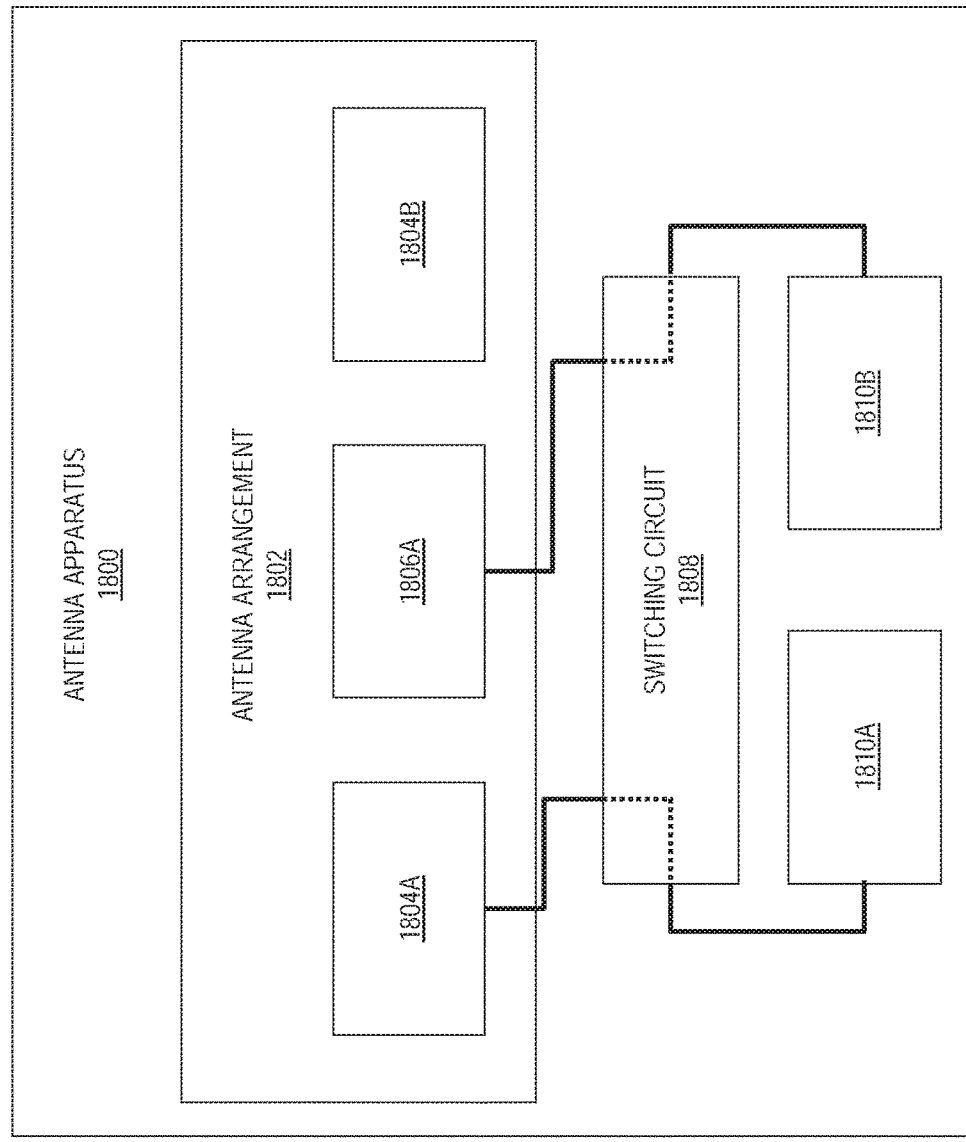
FIG. 18B is a block diagram of an antenna apparatus with example connections using the switching circuit, according to one embodiment of the present disclosure.

FIG. 18B illustrates an example of the antenna apparatus 1800 as shown in FIG. 18A where the plurality of antenna elements 1804 includes antenna elements 1804A and 1804B, the one or more probes 1806 includes a probe 1806A, and the UDC circuits 1810 include UDC circuits 1810A and 1810B. The switching circuit 1808 may then be configured to connect the UDC circuit 1810A to the antenna element 1804A (as shown in FIG. 18B with a thick line connecting the UDC circuit 1810A and the antenna element 1804A, the line going through the switching circuit 1808), while connecting the UDC circuit 1810B to the probe 1806A (as shown in FIG. 18B with a thick line connecting the UDC circuit 1810B and the probe 1806A, the line going through the switching circuit 1808). In this manner, the switching circuit 1808 may enable calibration by configuring the UDC circuit 1810A to operate in its first mode (i.e., disconnected from the probes 1806) while configuring the UDC circuit 1810B to operate in its second mode (i.e., connected to the probe 1801A), which enables propagation of wireless RF signals between the antenna element 1804A and the probe 1806A.

In general, not all of the UDC circuits 1810 that may be present in the antenna apparatus 1800 may need to be configured to operate in one of these two modes of operation. For example, as described above, in some settings, an antenna array may include many antenna elements 1804, e.g., 64 antenna elements, but only one or two probes 1806, e.g., as shown in FIG. 9 and FIG. 8A, respectively. If the one or more probes 1806 only include a single probe, then, in some embodiments, the switching circuit 1808 may be such as to configure only one of the UDC circuits 1810 to operate in the two modes as described herein (one mode at one time and another mode at another time). In other embodiments of using a single probe, the switching circuit 1808 may be such as to configure one of the UDC circuits 1810 to operate in the two modes as described herein but only for the purpose of upconverting the signals to be wirelessly transmitted by the probe, while configuring another one of the UDC circuits 1810 to operate in the two modes as described herein but only for the purpose of downconverting the RF signals wirelessly received by the probe. For any additional probes 1806, the switching circuit 1808 may configure connections between one of the UDC circuits 1810 and the probes 1806 in an analogous manner. It should also be noted that, in some embodiments, if the one or more probes 1806 include two or more probes, it may be that the switching circuit 1808 connects each of the probes 1806 to a different one of the UDC circuits 1810 when the probe is to wirelessly transmit and/or receive RF signals for calibration purposes as described herein. However, in other embodiments, the switching circuit 1808 may connect different ones of the two or more probes 1806 to a single one of the UDC circuits 1810 at different times.

Together, the one or more probes 1806 and the switching circuit 1808 may be considered to provide a calibration arrangement, because, together, they enable performing calibration of any of the antenna elements 1804, as well as antenna elements of other arrays (not specifically shown in FIG. 18). In some embodiment, such a calibration arrangement may also include a processor (e.g., any of the processors described herein, e.g. the processor 1030, described above), which may include multiple processors, configured to perform various processing functions related to calibration of the antenna elements as described herein. For example, the processor may be configured to identify one or more relationships between at least one of the antenna elements 1804 connected to one of the UDC circuits 1810 (e.g., the antenna element 1804A connected to the UDC circuit 1810A as shown in FIG. 18B) and the at least one of the probes 1806 connected to another one of the UDC circuits 1810 (e.g., the probe 1806A connected to the UDC circuit 1810B as shown in FIG. 18B), the latter UDC circuit operating in the second mode. The processor may further be configured to determine calibration information for calibrating one or more of the antenna elements 1804 based on the one or more relationships that have been identified. For example, in some embodiments, the calibration arrangement (e.g., the processor) may be configured to determine the calibration information by determining at least one of a relative amplitude relationship or a relative phase relationship among two or more of the plurality of antenna elements 1804, e.g., using any of the approaches described herein. Some further examples of how the calibration arrangement may be configured to use measurements of wireless RF signals propagating between various ones of the antenna elements 1804 and the one or more probes 1806 (e.g., between the antenna element 1804A and the probe 1806B, shown in FIG. 18B) to perform calibration of one or more antenna elements 1804 are provided below. However, any of the calibration techniques in accordance with the description of any of FIGS. 1-17 may also be implemented by the calibration arrangement of the antenna apparatus 1800.

In one further example, a first one of the UDC circuits 1810 may be configured to generate RF TX signals and may be connected, in its second mode of operation, to at least one of the one or more probes 1806, using the appropriate configuration of the switching circuit 1808 (e.g., the UDC circuit 1810B connected to the probe 1806A, shown in FIG. 18B). In this manner, the first UDC circuit 1810 is able to provide the RF TX signals to the at least one probe 1806 to which it is connected, to be wirelessly transmitted by said probe(s) 1806. Meanwhile, a second one of the UDC circuits 1810 may be configured to receive RF RX signals and may be connected, in its first mode of operation, to at least one of the antenna elements 1804, also using the appropriate configuration of the switching circuit 1808 (e.g., the UDC circuit 1810A connected to the antenna element 1804A, shown in FIG. 18B). In this manner, the second UDC circuit 1810 is able to receive and downconvert the RF RX signals wirelessly received by the at least one of the antenna elements 1804 to which it is connected. During calibration, the first UDC circuit 1810 enables the at least one probe 1806 to which it is connected to wirelessly transmit RF TX signals generated by the first UDC circuit 1810, while, at substantially the same time, at least one of the antenna elements 1804 wirelessly receives RF RX signals indicative of (e.g., including at least portions of, possibly attenuated) the RF TX signals wirelessly transmitted by the at least one probe 1806 connected to the first UDC circuit 1810, and the second UDC circuit 1810 connected to said at least one of the antenna elements 1804 downconverts the received RF RX signals for further processing. In such an example, the calibration arrangement (e.g., a processor) may then be configured to perform calibration of one or more of the antenna elements based on the one or more RF TX signals transmitted by the at least one probe and the one or more RF RX signals received by the at least one antenna element in any of the manners described herein. For example, the calibration arrangement may be configured to identify relative relationships between antenna elements (e.g., as specified in some claims below), determine calibration information for calibrating one or more of the antenna elements based on the identified relative relationships, and perform calibration of the one or more of the antenna elements accordingly.

In another further example, a first one of the UDC circuits 1810 may be configured to receive RF RX signals and may be connected, in its second mode of operation, to at least one of the one or more probes 1806, using the appropriate configuration of the switching circuit 1808 (e.g., the UDC circuit 1810B connected to the probe 1806A, shown in FIG. 18B). In this manner, the first UDC circuit 1810 is able to receive and downconvert the RF RX signals wirelessly received by the at least one probe 1806 to which it is connected. Meanwhile, a second one of the UDC circuits 1810 may be connected, in its first mode of operation, to at least one of the antenna elements 1804, also using the appropriate configuration of the switching circuit 1808 (e.g., the UDC circuit 1810A connected to the antenna element 1804A, shown in FIG. 18B), and may be configured to provide the RF TX signals to be wirelessly transmitted by said at least one of the antenna elements 1804 to which it is connected. In this manner, the second UDC circuit 1810 is able to provide the RF TX signals to the at least one of the antenna elements 1804 to which it is connected, to be wirelessly transmitted by said at least one of the antenna elements 1804. During calibration, the second UDC circuit 1810 enables the at least one of the antenna elements 1804 to which it is connected to wirelessly transmit RF TX signals generated by the second UDC circuit 1810, while, at substantially the same time, at least one probe 1806 wirelessly receives RF RX signals indicative of (e.g., including at least portions of, possibly attenuated) the RF TX signals wirelessly transmitted by the at least one of the antenna elements 1804 connected to the second UDC circuit 1810, and the first UDC circuit 1810 connected to said at least one probe 1806 downconverts the received RF RX signals for further processing. In such an example, the calibration arrangement (e.g., a processor) may then be configured to perform calibration of one or more of the antenna elements based on the one or more RF TX signals transmitted by the at least one antenna element and the one or more RF RX signals received by the at least one probe in any of the manners described herein. For example, the calibration arrangement may be configured to identify relative relationships between antenna elements (e.g., as specified in some claims below), determine calibration information for calibrating one or more of the antenna elements based on the identified relative relationships, and perform calibration of the one or more of the antenna elements accordingly.

In one example, the antenna elements 1804 may include a first antenna element, a second antenna element, and a third antenna element. The second antenna element may be disposed substantially equidistant to the first antenna element and the second antenna element. The one or more probes 1806 may include a first probe, disposed substantially equidistant to the first and second antenna elements. In the second mode, the switching circuit 1808 may be configured to connect the first probe 1806 to the UDC circuit 1810. In this configuration, the calibration arrangement (e.g., a processor of the calibration arrangement) may be configured to identify a first relative relationship between the first antenna element and the second antenna element based on observations of one or more probe signals propagating between (i) the first probe and the first antenna element and (ii) the first probe and the second antenna element, identify a second relation relationship between the first antenna element and the third antenna element using one or more antenna signals propagating between (i) the second antenna element and the first antenna element and (ii) the second antenna element and the third antenna element, and determine calibration information for calibrating one or more of the antenna elements based on the first relative relationship and the second relative relationship. In one further embodiment of such an example, the one or more probe signals may include a first probe signal and, in the second mode, the antenna apparatus 1800 may be configured to transmit the first probe signal from the first probe and receive the first probe signal at the first antenna element (e.g., the antenna apparatus may be the antenna apparatus according to example 3), and the calibration arrangement may be configured to identify the first relative relationship based on the first probe signal received at the first antenna element. In another further embodiment of such an example, the antenna elements 1804 may further include a fourth antenna element, and the one or more probes 1806 may further include a second probe, disposed substantially equidistant to the first and fourth antenna elements. In this case, in the second mode, the calibration arrangement may be further configured to identify a third relative relationship between the first antenna element and the fourth antenna element based on observations of one or more second probe signals propagating between (i) the second probe and the first antenna element and (ii) the second probe and the fourth antenna element, where the calibration arrangement is configured to determine the calibration information further based on the third relative relationship.

In various embodiments, the switching circuit 1808 may take on any suitable configuration to connect one or more of the UDCs 1810 to various ones of the antenna elements 1804 and the one or more probes 1806, examples of some of which are described below.

In some embodiments, the antenna apparatus 1800 may include a power divider or a coupler, configured to connect the switching circuit 1808 to any node in (i.e., any element in) a receive path or in a transmit path of a particular UDC circuit 1810. In various embodiments, such a power divider or a coupler may include any one of: 1) single-ended to single-ended (S2S) connection, 2) differential to differential (D2D) connection, 3) single-ended to differential (S2D) connection, or 4) differential to single-ended (D2S) connection. In other embodiments, the switching circuit 1808 may be connected to any element in the receive or transmit path of the UDC circuit 1810 using a direct connection (i.e., without a power divider or a coupler).

In some embodiments, the switching circuit 1808 may include a switch configured to select a transmit or a receive mode of operation for the at least one of the one or more probes 1806 to be connected to one of the UDC circuits 1810 in its the second mode of operation.

In some embodiments, the switching circuit 1808 may include a switch configured to connect a receive path and a transmit path of a given UDC circuit 1810. In this manner, the switching circuit 1808 may advantageously be used to perform TX-RX loopback testing, e.g., using any of the ways of performing such testing known in the art when the RX and TX paths of a UDC circuit are connected to one another. The switching circuit 1808 may be configured to ensure that, when TX-RX loopback testing is performed, all of the probes are disconnected from said UDC circuit 1810.

In some embodiments, the one or more probes 1806 may include two or more probes, and the switching circuit 1808 may include a switch configured to select the at least one of the two or more probes 1806 to be connected to one of the UDC circuits 1810 in the second mode. In some such embodiments, said switch may be implemented as a resonant switch, which may advantageously improve probe-to-probe isolation.

In some embodiments of the antenna apparatus 1800, the antenna arrangement 1802 may not be included within the antenna apparatus 1800, but be communicatively coupled to the antenna apparatus 1800 so that RF signals can be provided from antenna apparatus 1800 (e.g., signals upconverted to RF signals using any of the plurality of UDC circuits 1810) to be wirelessly transmitted by any of the antenna elements 1804 and the probes 1806, and/or so that RF signals received by any of the antenna elements 1804 and the probes 1806 may be provided to the antenna apparatus 1800 for further processing (e.g., for downconversion using any of the plurality of UDC circuits 1810).

In various embodiments of the antenna apparatus 1800, any of the antenna elements 1804, the one or more probes 1806, the switching circuit 1808, and the UDC circuits 1810 may be provided on the same or different dies. For example, in some embodiments, the antenna elements 1804 and the one or more probes 1806 may be provided on one face of a die, while the switching circuit 1808 and the UDC circuits 1810 may be provided on the other face of the same die. In other embodiments, the antenna elements 1804 and the one or more probes 1806 may be provided on one die, while the switching circuit 1808 and the UDC circuits 1810 may be provided on a different die. In some embodiments, different dies may be provided, each housing a combination of one or more of the UDC circuits 1810 and a switching circuit 1808. Thus, in such embodiments, multiple instances of the switching circuits 1808 may be provided. In other embodiments, at least some of the UDCs 1810 may be associated/integrated with a corresponding switching circuit 1808, in which case also multiple instances of the switching circuits 1808 may be provided, irrespective of their placement on one or more dies. In the following, the switching functionality is described by referring to the switching circuit 1808 in a singular form, but the descriptions are equally applicable to the switching circuit 1808 including multiple instances of separate switching circuits.

The antenna apparatus 1800 may be implemented in a large variety of settings. For example, in some embodiments, the antenna apparatus 1800 may be included in a 5G wireless communication system, e.g. within a base station or within a user equipment device of a 5G wireless communication system. In another example, the antenna apparatus 1800 may be included in a radar system, e.g., in an automotive radar system. In yet another example, the antenna apparatus 1800 may be used in as a self-calibration tool for the UDC and its associated digital pre-distortion (DPD) module.

Select Examples

Example 1 provides an antenna apparatus for calibrating one or more of a plurality of antenna elements of an antenna array using one or more probes, where each of the one or more probes includes an element configured to wirelessly transmit and/or receive RF signals (i.e., each of the one or more probes includes an antenna element, provided in addition to antenna elements of the antenna array). The antenna apparatus includes a calibration arrangement including a switching circuit. The antenna apparatus further includes an upconverter and/or downconverter (UDC) circuit (i.e., circuit that includes 1) an upconverter but no downconverter, 2) a downconverter but no upconverter, or 3) both an upconverter and a downconverter). The switching circuit is configured to enable operation of the UDC circuit in a first mode or in a second mode (i.e., the switching circuit is configured to select/control whether, at a given time during operation of the antenna apparatus, the UDC circuit operates in the first mode or in the second mode; e.g., at a first time, the switching circuit may ensure that the UDC circuit operates in the first mode and, at a second time, the switching circuit may ensure that the UDC circuit operates in the second mode). In the first mode, the switching circuit is configured to ensure that the one or more probes are electrically disconnected from the UDC circuit (i.e., the UDC does not provide signals to or receive signals from any of the probes). In the second mode, the switching circuit is configured to connect at least one of the one or more probes to the UDC circuit so that the UDC may provide signals to or receive signals from said probe, and the calibration arrangement is configured to use the UDC circuit to perform calibration of the antenna array.

Example 2 provides the antenna apparatus according to example 1, where the calibration arrangement using the UDC circuit to perform calibration of the antenna array includes the UDC circuit generating one or more RF transmit (TX) signals (i.e., one or more probe signals to be transmitted by the probe) to be wirelessly transmitted by the at least one probe that is connected to the UDC circuit, and the at least one probe that is connected to the UDC circuit wirelessly transmitting the one or more RF TX signals.

Example 3 provides the antenna apparatus according to example 2, where the UDC circuit is a first UDC circuit, the antenna apparatus further includes a second UDC circuit, and the switching circuit is configured to enable operation of the second UDC circuit in the first mode or in the second mode. When the first UDC circuit operates in the second mode, the second UDC circuit operates in the first mode (i.e., all probes are disconnected from the second UDC circuit) and the switching circuitry connects the second UDC circuit to at least one of the plurality of antenna elements, the first UDC circuit generates one or more RF TX signals to be wirelessly transmitted by the at least one probe that is connected to the first UDC circuit and the at least one probe that is connected to the first UDC wirelessly transmits the one or more RF TX signals, the at least one antenna element that is connected to the second UDC circuit wirelessly receives one or more RF receive (RX) signals (i.e., one or more antenna signals received by the antenna element), the one or more RF RX signals indicative of (e.g. including at least portions of, possibly attenuated) the one or more RF TX signals transmitted by the at least one probe, and the second UDC circuit downconverts the one or more RF RX signals.

Example 4 provides the antenna apparatus according to example 1, where the calibration arrangement using the UDC circuit to perform calibration of the antenna array includes the at least one probe that is connected to the UDC circuit wirelessly receiving one or more RF receive (RX) signals (i.e., one or more probe signals received by the probe), and the UDC circuit downconverting the one or more RF RX signals.

Example 5 provides the antenna apparatus according to example 4, where the UDC circuit is a first UDC circuit, the antenna apparatus further includes a second UDC circuit, and the switching circuit is configured to enable operation of the second UDC circuit in the first mode or in the second mode. When the first UDC circuit operates in the second mode, the second UDC circuit operates in the first mode (i.e., all probes are disconnected from the second UDC circuit) and the switching circuitry connects the second UDC circuit to at least one of the plurality of antenna elements, the second UDC circuit generates one or more RF TX signals to be wirelessly transmitted by the at least one antenna element that is connected to the second UDC circuit and the at least one antenna element that is connected to the second UDC wirelessly transmits the one or more RF TX signals, the at least one probe that is connected to the first UDC circuit wirelessly receives one or more RF receive (RX) signals (i.e., one or more probe signals received by the probe), the one or more RF RX signals indicative of (e.g. including at least portions of, possibly attenuated) the one or more RF TX signals transmitted by the at least one antenna element that is connected to the second UDC circuit, and the first UDC circuit downconverts the one or more RF RX signals.

Example 6 provides the antenna apparatus according to any one of the preceding examples, where the switching circuit and the UDC circuit are provided on a single die.

Example 7 provides the antenna apparatus according to any one of the preceding examples, further including the one or more probes.

Example 8 provides the antenna apparatus according to any one of the preceding examples, further including the plurality of antenna elements.

Example 9 provides the antenna apparatus according to example 8, where the switching circuit, the UDC circuit, the one or more probes, and the plurality of antenna elements are provided on a single die.

Example 10 provides the antenna apparatus according to example 9, where the die includes a first face and a second face, the second face being opposite to the first face, the plurality of antenna elements and the one or more probes are provided at the first face of the die, and the UDC circuit and the switching circuit are provided at the second face of the die.

Example 11 provides the antenna apparatus according to any one of the preceding examples, where the one or more probes includes two or more probes, and where the switching circuit includes a switch configured to select the at least one of the two or more probes to be connected to the UDC circuit in the second mode.

Example 12 provides the antenna apparatus according to example 11, where the switch configured to select the at least one of the two or more probes is a resonant switch, which may advantageously improve probe-to-probe isolation.

Example 13 provides the antenna apparatus according to any one of the preceding examples, where the switching circuit includes a switch configured to select a transmit or a receive mode of operation for the at least one of the one or more probes to be connected to the UDC circuit in the second mode.

Example 14 provides the antenna apparatus according to any one of the preceding examples, where the switching circuit includes a switch configured to connect a receive path and a transmit path of the UDC circuit. In this manner, the switching circuit as described herein may advantageously be used to perform TX-RX loopback testing.

Example 15 provides the antenna apparatus according to any one of the preceding examples, further including a power divider or a coupler, configured to connect the switching circuit to a node in (i.e., any element in) a receive path or in a transmit path of the UDC circuit.

Example 16 provides the antenna apparatus according to any one of the preceding examples, where the calibration arrangement (e.g., a processor of the calibration arrangement) is configured to identify one or more relationships between at least one of the antenna elements and the at least one probe connected to the UDC circuit in the second mode, determine calibration information for calibrating one or more of the antenna elements based on the one or more relationships.

Example 17 provides the antenna apparatus according to example 16, where determining the calibration information includes determining at least one of a relative amplitude relationship or a relative phase relationship among two or more of the plurality of antenna elements.

Example 18 provides the antenna apparatus according to according to any one of the preceding examples, where the plurality of antenna elements includes a first antenna element, a second antenna element, and a third antenna element, the second antenna element being disposed substantially equidistant to the first antenna element and the second antenna element, the one or more probes include a first probe, disposed substantially equidistant to the first and second antenna elements, and, in the second mode, the switching circuit is configured to connect the first probe to the UDC circuit. In the second mode, the calibration arrangement (e.g., a processor of the calibration arrangement) is configured to identify a first relative relationship between the first antenna element and the second antenna element based on observations of one or more probe signals propagating between (i) the first probe and the first antenna element and (ii) the first probe and the second antenna element, identify a second relation relationship between the first antenna element and the third antenna element using one or more antenna signals propagating between (i) the second antenna element and the first antenna element and (ii) the second antenna element and the third antenna element, and determine calibration information for calibrating one or more of the antenna elements based on the first relative relationship and the second relative relationship.

Example 19 provides the antenna apparatus according to example 18, where the one or more probe signals include a first probe signal, in the second mode, the antenna apparatus is configured to transmit the first probe signal from the first probe and receive the first probe signal at the first antenna element (e.g., the antenna apparatus may be the antenna apparatus according to example 3), and the calibration arrangement is configured to identify the first relative relationship based on the first probe signal received at the first antenna element.

Example 20 provides the antenna apparatus according to examples 18 or 19, where the plurality of antenna elements further includes a fourth antenna element, and the one or more probes further include a second probe, disposed substantially equidistant to the first and fourth antenna elements.

Example 21 provides the antenna apparatus according to example 20, where, in the second mode, the calibration arrangement is further configured to identify a third relative relationship between the first antenna element and the fourth antenna element based on observations of one or more second probe signals propagating between (i) the second probe and the first antenna element and (ii) the second probe and the fourth antenna element, where the calibration arrangement is configured to determine the calibration information further based on the third relative relationship.

Example 22 provides the antenna apparatus according to example 21, where the plurality of antenna elements further includes a fifth antenna element and a sixth antenna element, and where, in the second mode, the calibration arrangement is further configured to identify a fourth relative relationship between the fifth antenna element and the sixth antenna element based on observations of signals of the fifth antenna element and the sixth antenna element propagating simultaneously, where the calibration arrangement is configured to determine the calibration information further based on the fourth relative relationship.

Example 23 provides the antenna apparatus according to according to any one of the preceding examples, where the UDC circuit is one of a plurality of UDC circuits, the switching arrangement is configured to enable operation of each of the plurality of UDC circuits in the first mode or in the second mode, the switching arrangement is configures to ensure that, when a first UDC circuit of the plurality of UDC circuits operates in the second mode, a second UDC circuit of the plurality of UDC circuits operates in a first mode (i.e., is disconnected from all probes) and is connected to at least one of the plurality of antenna elements, and the calibration arrangement is configured to perform calibration of one or more of the plurality of antenna elements based on RF signals propagating between the at least one probe connected to the first UDC circuit and the at least one antenna element connected to the second UDC circuit.

Example 24 provides the antenna apparatus according to according to any one of examples 1-23, where the antenna apparatus is included in a 5G wireless communication system.

Example 25 provides the antenna apparatus according to example 24, where the antenna apparatus is included in a base station of the 5G wireless communication system.

Example 26 provides the antenna apparatus according to example 24, where the antenna apparatus is included in a user equipment device of the 5G wireless communication system.

Example 27 provides the antenna apparatus according to according to any one of examples 1-23, where the antenna apparatus is included in a radar system.

Example 28 provides the antenna apparatus according to example 27, where the radar system is an automotive radar system.

Example 29 provides the antenna apparatus according to according to any one of examples 1-23, where the antenna apparatus is included in a phased antenna array system (e.g., used for calibration in communication and radar applications), and/or is used as a self-calibration for the UDC and its DPD.

Example 30 provides a method of operating an antenna apparatus that includes an antenna array having a plurality of antenna elements, an upconverter and/or downconverter (UDC) circuit, and a calibration arrangement having one or more probes and a switching circuit. The method includes using the switching circuit to configure the UDC circuit to operate in a first mode or in a second mode, where, in the first mode, the one or more probes are electrically disconnected from the UDC circuit, and, in the second mode, at least one of the one or more probes is connected to the UDC circuit and the calibration arrangement uses the UDC circuit to perform calibration of the antenna array. The method also includes operating the UDC circuit in the first mode or in the second mode, as configured by the switching circuit.

Example 31 provides the method according to example 30, where the antenna apparatus is an antenna apparatus according to any one of the preceding examples (e.g., the antenna apparatus according to any one of examples 1-29), and the method further includes corresponding steps of operating such an antenna apparatus.

Variations and Implementations

While embodiments of the present disclosure were described above with references to exemplary implementations as shown in FIGS. 1-18, a person skilled in the art will realize that the various teachings described above are applicable to a large variety of other implementations. For example, using a switching circuit to configure at least one UDC circuit to operate, at different times, in different ones of a first mode and a second mode to enable calibration of an antenna array may be used in phased array calibration for communication and radar applications, as well as a self-calibration for the UDC and a DPD module associated therewith.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g., clocks, multiplexers, buffers, and/or other components can readily be replaced, substituted, or otherwise modified in order to accommodate particular circuit needs. Moreover, it should be noted that the use of complementary electronic devices, hardware, software, etc., offer an equally viable option for implementing the teachings of the present disclosure related to virtual dithering.

Parts of various systems for using a switching circuit to configure at least one UDC circuit to operate, at different times, in different ones of a first mode and a second mode to enable calibration of an antenna array as proposed herein can include electronic circuits to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuit can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc., can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuit configured to perform a specific application or function) or implemented as plug-in modules into application specific hardware of electronic devices. Note that particular embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in any of FIGS. 1-18, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the present figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to using a switching circuit to configure at least one UDC circuit to operate, at different times, in different ones of a first mode and a second mode to enable calibration of an antenna array as proposed herein illustrate only some of the possible functions that may be executed by, or within, system illustrated in the present figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Although the claims are presented in single dependency format in the style used before the USPTO, it should be understood that any claim can depend on and be combined with any preceding claim of the same type unless that is clearly technically infeasible.

The invention claimed is:

1. An antenna apparatus for calibrating one or more of a plurality of antenna elements of an antenna array using one or more probes, where an individual probe of the one or more probes is to wirelessly transmit, receive, or both transmit and receive radio frequency (RF) signals, the antenna apparatus comprising:
a calibration arrangement comprising a switching circuit; and
a frequency converter circuit, comprising at least one of upconverter circuitry and downconverter circuitry, wherein:
the switching circuit is to enable operation of the frequency converter circuit in a first mode or in a second mode,
in the first mode, the switching circuit is to ensure that the one or more probes are disconnected from the frequency converter circuit, and
in the second mode, the switching circuit is to connect at least one of the one or more probes to the frequency converter circuit, and the calibration arrangement is to use the frequency converter circuit to perform calibration of the antenna array.

2. The antenna apparatus according to claim 1, wherein, in the second mode:
the frequency converter circuit is to generate one or more RF transmit (TX) signals to be wirelessly transmitted by the at least one probe that is connected to the frequency converter circuit, and
the at least one probe that is connected to the frequency converter circuit is to wirelessly transmit the one or more RF TX signals.

3. The antenna apparatus according to claim 2, wherein:
the frequency converter circuit is a first frequency converter circuit,
the antenna apparatus further includes a second frequency converter circuit,
the switching circuit is to enable operation of the second frequency converter circuit in the first mode or in the second mode, and
when the first frequency converter circuit is in the second mode:
the second frequency converter circuit is in the first mode and the switching circuitry is to connect the second frequency converter circuit to at least one of the plurality of antenna elements,
the first frequency converter circuit is to generate one or more RF TX signals to be wirelessly transmitted by the at least one probe that is connected to the first frequency converter circuit and the at least one probe that is connected to the first frequency converter circuit is to wirelessly transmit the one or more RF TX signals,
the at least one antenna element that is connected to the second frequency converter circuit is to wirelessly receives one or more RF receive (RX) signals, the one or more RF RX signals indicative of the one or more RF TX signals transmitted by the at least one probe, and
the second frequency converter circuit is to downconvert the one or more RF RX signals.

4. The antenna apparatus according to claim 1, wherein, in the second mode:
the at least one probe that is connected to the frequency converter circuit is to wirelessly receive one or more RF receive (RX) signals, and
the frequency converter circuit is to downconvert the one or more RF RX signals.

5. The antenna apparatus according to claim 4, wherein:
the frequency converter circuit is a first frequency converter circuit,
the antenna apparatus further includes a second frequency converter circuit,
the switching circuit is to enable operation of the second frequency converter circuit in the first mode or in the second mode, and
when the first frequency converter circuit is in the second mode:
the second frequency converter circuit is to operate in the first mode and the switching circuitry is to connect the second frequency converter circuit to at least one of the plurality of antenna elements,
the second frequency converter circuit is to generate one or more RF TX signals to be wirelessly transmitted by the at least one antenna element that is connected to the second frequency converter circuit and the at least one antenna element that is connected to the second frequency converter circuit is to wirelessly transmit the one or more RF TX signals,
the at least one probe that is connected to the first frequency converter circuit is to wirelessly receive one or more RF receive (RX) signals, the one or more RF RX signals indicative of the one or more RF TX signals transmitted by the at least one antenna element that is connected to the second frequency converter circuit, and
the first frequency converter circuit is to downconvert the one or more RF RX signals.

6. The antenna apparatus according to claim 1, wherein the switching circuit and the frequency converter circuit are on a single die.

7. The antenna apparatus according to claim 1, further comprising the one or more probes.

8. The antenna apparatus according to claim 1, further comprising the plurality of antenna elements.

9. The antenna apparatus according to claim 8, wherein the switching circuit, the frequency converter circuit, the one or more probes, and the plurality of antenna elements are on a single die.

10. The antenna apparatus according to claim 9, wherein:
the die includes a first face and a second face, the second face being opposite to the first face,
the plurality of antenna elements and the one or more probes are at the first face of the die, and
the frequency converter circuit and the switching circuit are at the second face of the die.

11. The antenna apparatus according to claim 1, wherein the one or more probes includes two or more probes, and wherein the switching circuit includes a switch to select the at least one of the two or more probes to be connected to the frequency converter circuit in the second mode.

12. The antenna apparatus according to claim 11, wherein the switch to select the at least one of the two or more probes is a resonant switch.

13. The antenna apparatus according to claim 1, wherein the switching circuit includes a switch to connect a receive path and a transmit path of the frequency converter circuit.

14. The antenna apparatus according to claim 1, wherein the calibration arrangement is to:
identify one or more relationships between at least one of the antenna elements and the at least one probe connected to the frequency converter circuit in the second mode,
determine calibration information for calibrating one or more of the antenna elements based on the one or more relationships.

15. The antenna apparatus according to claim 14, wherein determining the calibration information includes determining at least one of a relative amplitude relationship or a relative phase relationship among two or more of the plurality of antenna elements.

16. The antenna apparatus according to claim 1, wherein:
the plurality of antenna elements includes a first antenna element, a second antenna element, and a third antenna element, the second antenna element being disposed substantially equidistant to the first antenna element and the second antenna element,
the one or more probes include a first probe, disposed substantially equidistant to the first and second antenna elements, and
in the second mode, the switching circuit is to connect the first probe to the frequency converter circuit and the calibration arrangement is to:
identify a first relative relationship between the first antenna element and the second antenna element based on observations of one or more probe signals propagating between (i) the first probe and the first antenna element and (ii) the first probe and the second antenna element,
identify a second relation relationship between the first antenna element and the third antenna element using one or more antenna signals propagating between (i) the second antenna element and the first antenna element and (ii) the second antenna element and the third antenna element, and
determine calibration information for calibrating one or more of the antenna elements based on the first relative relationship and the second relative relationship.

17. The antenna apparatus according to claim 16, wherein:
the one or more probe signals include a first probe signal,
in the second mode, the antenna apparatus is to transmit the first probe signal from the first probe and receive the first probe signal at the first antenna element, and
the calibration arrangement is to identify the first relative relationship based on the first probe signal received at the first antenna element.

18. The antenna apparatus according to claim 16, wherein:
the plurality of antenna elements further includes a fourth antenna element, and
the one or more probes further include a second probe, disposed substantially equidistant to the first and fourth antenna elements, and
in the second mode, the calibration arrangement is further to:
identify a third relative relationship between the first antenna element and the fourth antenna element based on observations of one or more second probe signals propagating between (i) the second probe and the first antenna element and (ii) the second probe and the fourth antenna element,
wherein the calibration arrangement is to determine the calibration information further based on the third relative relationship.

19. The antenna apparatus according to claim 1, wherein:
the frequency converter circuit is one of a plurality of frequency conversion circuits,
the switching arrangement is to enable operation of each of the plurality of frequency conversion circuits in the first mode or in the second mode,
the switching arrangement is to ensure that, when a first frequency converter circuit of the plurality of frequency conversion circuits operates in the second mode, a second frequency converter circuit of the plurality of frequency conversion circuits operates in a first mode and is connected to at least one of the plurality of antenna elements, and
the calibration arrangement is to perform calibration of one or more of the plurality of antenna elements based on RF signals propagating between the at least one probe connected to the first frequency converter circuit and the at least one antenna element connected to the second frequency converter circuit.

20. A method of operating an antenna apparatus that includes an antenna array having a plurality of antenna elements, a frequency converter circuit that includes at least one of upconverter circuitry and downconverter circuitry, one or more probes, and a switching circuit, the method comprising:
the switching circuit configuring the frequency converter circuit to operate in a first mode or in a second mode, wherein:
in the first mode, the one or more probes are disconnected from the frequency converter circuit, and
in the second mode, at least one of the one or more probes is connected to the frequency converter circuit and the frequency converter circuit is used to perform calibration of the antenna array; and
operating the frequency converter circuit in the first mode or in the second mode.

21. The method according to claim 20, wherein, in the second mode, the method includes:
the frequency converter circuit generating one or more RF transmit (TX) signals to be wirelessly transmitted by the at least one probe that is connected to the frequency converter circuit, and
the at least one probe that is connected to the frequency converter circuit wirelessly transmitting the one or more RF TX signals.

22. The method according to claim 21, wherein the frequency converter circuit is a first frequency converter circuit, the antenna apparatus further includes a second frequency converter circuit, and the method further includes:
the switching circuit configuring the second frequency converter circuit to operate in the first mode or in the second mode,
wherein, when the first frequency converter circuit operates in the second mode, the method includes:
the second frequency converter circuit operating in the first mode and the switching circuitry connecting the second frequency converter circuit to at least one of the plurality of antenna elements,
the first frequency converter circuit generating one or more RF TX signals to be wirelessly transmitted by the at least one probe that is connected to the first frequency converter circuit and the at least one probe that is connected to the first frequency converter circuit wirelessly transmitting the one or more RF TX signals,
the at least one antenna element that is connected to the second frequency converter circuit wirelessly receiving one or more RF receive (RX) signals, the one or more RF RX signals indicative of the one or more RF TX signals transmitted by the at least one probe, and
the second frequency converter circuit downconverting the one or more RF RX signals.

23. The method according to claim 20, wherein, in the second mode, the method includes:
the at least one probe that is connected to the frequency converter circuit wirelessly receiving one or more RF receive (RX) signals, and
the frequency converter circuit downconverting the one or more RF RX signals.

24. The method according to claim 23, wherein the frequency converter circuit is a first frequency converter circuit, the antenna apparatus further includes a second frequency converter circuit, and the method further includes:
the switching circuit configuring the second frequency converter circuit to operate in the first mode or in the second mode, and
wherein, when the first frequency converter circuit operates in the second mode, the method includes:
the second frequency converter circuit operating in the first mode and the switching circuitry connecting the second frequency converter circuit to at least one of the plurality of antenna elements,
the second frequency converter circuit generating one or more RF TX signals to be wirelessly transmitted by the at least one antenna element that is connected to the second frequency converter circuit and the at least one antenna element that is connected to the second frequency converter circuit wirelessly transmitting the one or more RF TX signals,
the at least one probe that is connected to the first frequency converter circuit wirelessly receiving one or more RF receive (RX) signals, the one or more RF RX signals indicative of the one or more RF TX signals transmitted by the at least one antenna element that is connected to the second frequency converter circuit, and
the first frequency converter circuit downconverting the one or more RF RX signals.

25. The antenna apparatus according to claim 1, wherein the antenna apparatus is a base station.

26. The antenna apparatus according to claim 1, wherein the antenna apparatus is a user equipment device.

27. The antenna apparatus according to claim 1, wherein the antenna apparatus is a radar system.

28. An antenna apparatus for calibrating an antenna array using a probe to wirelessly transmit, receive, or both transmit and receive radio frequency (RF) signals, the antenna apparatus comprising:
a switching circuit; and
a frequency converter circuit,
wherein:
the switching circuit is to configure the frequency converter circuit to operate in a first mode or in a second mode,
in the first mode, the probe is disconnected from the frequency converter circuit, and
in the second mode, the probe is connected to the frequency converter circuit, and the frequency converter circuit to assist calibration of the antenna array.

29. The antenna apparatus according to claim 28, wherein, in the second mode:
the frequency converter circuit is to generate one or more RF transmit (TX) signals to be wirelessly transmitted by the probe, and
the probe is to wirelessly transmit the one or more RF TX signals.

30. The antenna apparatus according to claim 29, wherein:
the frequency converter circuit is a first frequency converter circuit,
the antenna apparatus further includes a second frequency converter circuit,
the switching circuit is to configure the second frequency converter circuit to operate in the first mode or in the second mode, and
when the first frequency converter circuit is in the second mode:
the second frequency converter circuit is to operate in the first mode and the switching circuit is to connect the second frequency converter circuit to an antenna element of the antenna array,
the first frequency converter circuit is to generate one or more RF TX signals to be wirelessly transmitted by the probe,
the antenna element is to wirelessly receive one or more RF receive (RX) signals, the one or more RF RX signals indicative of the one or more RF TX signals transmitted by the probe, and
the second frequency converter circuit is to downconvert the one or more RF RX signals.

31. The antenna apparatus according to claim 28, wherein, in the second mode:
the probe is to wirelessly receive one or more RF receive (RX) signals, and
the frequency converter circuit is to downconvert the one or more RF RX signals.

32. The antenna apparatus according to claim 31, wherein:
the frequency converter circuit is a first frequency converter circuit,
the antenna apparatus further includes a second frequency converter circuit,
the switching circuit is to configure the second frequency converter circuit to operate in the first mode or in the second mode, and
when the first frequency converter circuit is in the second mode:

the second frequency converter circuit is to operate in the first mode and the switching circuitry is to connect the second frequency converter circuit to an antenna element of the antenna array, the second frequency converter circuit is to generate one or more RF TX signals to be wirelessly transmitted by the antenna element, the probe is to wirelessly receive one or more RF receive (RX) signals, the one or more RF RX signals indicative of the one or more RF TX signals transmitted by the antenna element, and the first frequency converter circuit is to downconvert the one or more RF RX signals.

33. The antenna apparatus according to claim 28, further comprising the probe.

34. The antenna apparatus according to claim 28, further comprising the antenna array.

35. The antenna apparatus according to claim 28, wherein the antenna apparatus is one of a base station, a user equipment device, or a radar system.

* * * * *